(12) United States Patent
Scott et al.

(10) Patent No.: US 8,875,404 B2
(45) Date of Patent: Nov. 4, 2014

(54) PIPE CUTTER

(75) Inventors: John S. Scott, Brookfield, WI (US);
Michael Naughton, Dousman, WI (US);
Scott D. Eisenhardt, Pewaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 1325 days.

(21) Appl. No.: 12/667,217

(22) PCT Filed: Jul. 3, 2008

(86) PCT No.: PCT/US2008/069189
§ 371 (c)(1),
(2), (4) Date: Feb. 8, 2010

(87) PCT Pub. No.: WO2009/006588
PCT Pub. Date: Jan. 8, 2009

(65) Prior Publication Data
US 2011/0005083 A1    Jan. 13, 2011

Related U.S. Application Data

(60) Provisional application No. 60/947,706, filed on Jul. 3, 2007.

(51) Int. Cl.
*B23D 21/00* (2006.01)
*B23D 21/06* (2006.01)
*B25F 5/02* (2006.01)

(52) U.S. Cl.
CPC ............... *B23D 21/06* (2013.01); *B23D 21/00* (2013.01); *B25F 5/02* (2013.01)

USPC ............................ 30/93; 30/95; 30/98; 30/99

(58) Field of Classification Search
USPC ............................. 30/228, 93, 95, 97, 98–99
See application file for complete search history.

(56) References Cited

U.S. PATENT DOCUMENTS 1,762,392 A   6/1930   Gray
2,220,223 A   11/1940  Eerhard et al.
(Continued)

FOREIGN PATENT DOCUMENTS

CA   1301442   5/1992
DE   3105218   9/1982
(Continued)

OTHER PUBLICATIONS

PCT/US2008/069188 International Search Report and Written Opinion dated Sep. 30, 2008 (10 pages).

(Continued)

*Primary Examiner* — Omar Flores Sanchez
(74) *Attorney, Agent, or Firm* — Michael Best & Friedrich LLP

(57) ABSTRACT

A power tool includes a motor, a pipe holder configured to support a pipe, and a cutting mechanism coupled to the pipe holder. The cutting mechanism is movable relative to the pipe holder. The power tool also includes a drive mechanism coupled to the cutting mechanism and the motor to move the cutting mechanism from a starting position toward the pipe holder to cut the pipe. The drive mechanism includes a first member operable to disengage a second member to allow movement of the cutting mechanism to the starting position.

10 Claims, 19 Drawing Sheets

(56) References Cited

U.S. PATENT DOCUMENTS

| | | | |
|---|---|---|---|
| 2,716,812 A | 9/1955 | Noonan | |
| 2,731,721 A | 1/1956 | Traurig | |
| 2,927,373 A | 3/1960 | Taube | |
| 3,052,980 A | 9/1962 | Fieser | |
| 3,105,218 A | 9/1963 | Kozinski | |
| 3,178,816 A | 4/1965 | Schmid | |
| 3,453,914 A | 7/1969 | Lemper et al. | |
| 3,524,443 A | 8/1970 | Batlin | |
| 3,693,254 A | 9/1972 | Salonen | |
| 3,942,248 A | 3/1976 | Sherer et al. | |
| 4,283,851 A * | 8/1981 | Wolter | 30/134 |
| 4,368,577 A | 1/1983 | Babb | |
| 4,608,754 A | 9/1986 | Kloster | |
| 4,747,212 A | 5/1988 | Cavdek | |
| 4,769,911 A | 9/1988 | Araki | |
| 4,802,278 A | 2/1989 | Vanderpol et al. | |
| 4,989,322 A * | 2/1991 | Clayton | 30/228 |
| 5,002,135 A | 3/1991 | Pellenc | |
| 5,018,420 A | 5/1991 | Plomb | |
| 5,058,272 A | 10/1991 | Steube | |
| 5,067,240 A | 11/1991 | You | |
| 5,122,092 A * | 6/1992 | Abdul | 452/133 |
| 5,129,158 A | 7/1992 | Campagna | |
| 5,331,742 A | 7/1994 | Schmode et al. | |
| 5,642,566 A | 7/1997 | Hirabayashi | |
| 5,718,051 A | 2/1998 | Huang | |
| 5,758,729 A | 6/1998 | Undin | |
| 5,775,539 A | 7/1998 | Bates et al. | |
| 5,826,341 A | 10/1998 | Massa | |
| 5,829,142 A | 11/1998 | Rieser | |
| 5,836,079 A | 11/1998 | Cronin et al. | |
| 5,909,830 A | 6/1999 | Bates et al. | |
| 5,987,754 A | 11/1999 | Hirabayashi et al. | |
| 6,044,564 A | 4/2000 | Jeltsch | |
| 6,120,363 A | 9/2000 | Dunn | |
| 6,178,643 B1 | 1/2001 | Erbrick et al. | |
| 6,181,032 B1 | 1/2001 | Marshall et al. | |
| 6,370,780 B1 | 4/2002 | Robertson et al. | |
| 6,460,626 B2 | 10/2002 | Carrier | |
| 6,467,172 B1 | 10/2002 | Jenq | |
| 6,513,245 B1 | 2/2003 | Aubriot | |
| 6,553,670 B2 | 4/2003 | Chang | |
| 6,626,792 B2 | 9/2003 | Vranish | |
| 6,637,115 B2 | 10/2003 | Walsh et al. | |
| 6,658,739 B1 * | 12/2003 | Huang | 30/96 |
| 6,935,031 B1 | 8/2005 | Huang | |
| 7,013,567 B2 | 3/2006 | Myers | |
| 7,066,691 B2 | 6/2006 | Doyle et al. | |
| 7,116,071 B2 | 10/2006 | Glasgow et al. | |
| 7,152,325 B2 * | 12/2006 | Green et al. | 30/101 |
| 7,275,469 B2 | 10/2007 | Chen | |
| 7,293,362 B2 | 11/2007 | Konen | |
| 7,331,109 B2 | 2/2008 | Tu | |
| 7,363,711 B2 | 4/2008 | Janutin et al. | |
| 7,406,769 B1 * | 8/2008 | Toussaint | 30/93 |
| 7,544,146 B2 | 6/2009 | Vranish | |
| 7,578,461 B2 | 8/2009 | Sederberg et al. | |
| 7,601,091 B2 | 10/2009 | Vranish | |
| 7,845,080 B2 * | 12/2010 | Nasiell | 30/101 |
| 8,122,797 B2 * | 2/2012 | Bruurs | 83/13 |
| 8,266,991 B2 * | 9/2012 | Thorson et al. | 82/76 |
| 2004/0055164 A1 | 3/2004 | Molins | |
| 2005/0150113 A1 | 7/2005 | Shultis | |
| 2005/0274025 A1 | 12/2005 | Lin | |
| 2006/0053633 A1 * | 3/2006 | Gurri Molins | 30/228 |
| 2006/0087286 A1 | 4/2006 | Phillips et al. | |
| 2006/0092674 A1 | 5/2006 | Belton et al. | |
| 2006/0219039 A1 | 10/2006 | Vranish | |
| 2006/0278057 A1 | 12/2006 | Wuertemberger | |
| 2007/0050984 A1 | 3/2007 | Bartoluzzi | |
| 2007/0214648 A1 * | 9/2007 | Lazarevic | 30/102 |
| 2008/0045374 A1 | 2/2008 | Weinberg et al. | |
| 2008/0201961 A1 | 8/2008 | Wu et al. | |
| 2009/0199407 A1 * | 8/2009 | Lazarevic | 30/95 |
| 2010/0018059 A1 * | 1/2010 | Huang | 30/92 |
| 2010/0077621 A1 * | 4/2010 | Quigley et al. | 30/228 |
| 2011/0061242 A1 * | 3/2011 | Chen et al. | 30/228 |
| 2013/0000130 A1 * | 1/2013 | Maniwa | 30/228 |
| 2013/0036614 A1 * | 2/2013 | Seigneur | 30/151 |
| 2013/0055574 A1 * | 3/2013 | Nie et al. | 30/228 |
| 2013/0055575 A1 * | 3/2013 | Delmas | 30/228 |

FOREIGN PATENT DOCUMENTS

| | | |
|---|---|---|
| DE | 3524443 | 1/1987 |
| EP | 1350428 | 10/2003 |
| EP | 1525958 | 4/2005 |
| GB | 2459829 | 9/2008 |
| JP | 55005270 | 1/1980 |
| JP | 10000509 | 1/1998 |
| JP | 2001204251 | 7/2001 |
| WO | 2006096172 | 9/2006 |
| WO | 2009/006587 | 1/2009 |
| WO | 2009/006596 | 1/2009 |
| WO | 2009006588 | 1/2009 |

OTHER PUBLICATIONS

PCT/US08/69209 International Search Report and Written Opinion dated Oct. 7, 2008 (9 pages).
PCT/US2008/069189 International Search Report and Written Opinion dated Oct. 14, 2008 (10 pages).
PCT/US2009/055353 International Search Report and Written Opinion dated Oct. 20, 2009 (7 pages).
PCT/US2009/055371 International Search Report and Written Opinion dated Oct. 20, 2009 (7 pages).
Tech Briefs, "Phase-Oriented Gear Systems", NASA Tech Briefs, Goddard Space Flight Center, Greenbelt, Maryland, available online at: <http://www.techbriefs.com/component/content/article/2425>, Nov. 1, 2007.
Shelley, Tom, "Armed to the Teeth", Eureka, available online at: <http://www.eurekamagazine.co.uk/article/13038/Armed-to-the-teeth.aspx>, Feb. 9, 2008.
Milwaukee Electric Tool, "Milwaukee Introduces New 12-volt Sub-Compact Driver", News and Media—Press Releases, available online at: <http://www.milwaukeetool.com/NewsAndMedia/PressReleases/Details.aspx? PublicationId=954>, Sep. 20, 2007.
Intellectual Property Office of Great Britain Examination Report for Application No. 1000846.4 dated Nov. 7, 2011, 3 pages.
Intellectual Property Office of Great Britain Examination Report for Application No. 1000847.2 dated Nov. 7, 2011, 4 pages.
GB1000846.4—Examination Report dated Jul. 8, 2011 (3 pages).
GB1000847.2 Examination Report dated Jul. 8, 2011 (3 pages).
Intellectual Property Office of Great Britain Examination Report for Application No. 1000847.2 dated Apr. 9, 2013 (5 pages).
Office Action from the US Patent and Trademark Office for U.S. Appl. No. 12/667,216 dated May 3, 2013 (7 pages).

* cited by examiner

PIPE CUTTER

CROSS-REFERENCE TO RELATED APPLICATIONS

This application claims priority to U.S. Provisional Patent Application No. 60/947,706, entitled "PIPE CUTTER", filed Jul. 3, 2007 by John S. Scott, the entire contents of which is hereby incorporated by reference.

BACKGROUND

The present invention generally relates to power tools and, more specifically, to battery-powered pipe cutters.

Manually-operated pipe cutters perform cutting operations in various ways, such as with sawing motions or by successive ratcheting of a pipe cutter knife through a pipe. Oftentimes, these methods of pipe cutting result in imperfect cuts or, when cutting a pipe of a material such as PVC, snapping of the pipe. Manually-operated pipe cutters also cause ergonomic difficulties for the user. In particular, a user having a relatively small hand size or low hand or wrist strength may experience difficulty completing a pipe cut. Additionally, the use of manually-operated pipe cutters can be time consuming.

SUMMARY

In one embodiment, the invention provides a power tool including a motor, a pipe holder configured to support a pipe, and a cutting mechanism coupled to the pipe holder. The cutting mechanism is movable relative to the pipe holder. The power tool also includes a drive mechanism coupled to the cutting mechanism and the motor. The drive mechanism is operable to move the cutting mechanism from a starting position toward the pipe holder to cut the pipe. The drive mechanism includes a first member operable to disengage a second member to allow movement of the cutting mechanism to the starting position.

In another embodiment, the invention provides a power tool including a motor, a pipe holder, and a cutting mechanism coupled to the pipe holder. The cutting mechanism is movable in a first direction toward the pipe holder and is movable in a second direction away from the pipe holder. The power tool also includes a drive mechanism coupled to the cutting mechanism and the motor. The drive mechanism is adjustable between a first configuration, in which the drive mechanism moves the cutting mechanism in the first direction, and a second configuration, in which the drive mechanism allows movement of the cutting mechanism in the second direction.

In yet another embodiment, the invention provides a pipe cutter including a housing assembly, a motor positioned at least partially within the housing assembly, and a pipe holder coupled to the housing assembly. The pipe holder is configured to support a pipe. The pipe cutter also includes a cutting mechanism coupled to the pipe holder. The cutting mechanism is movable in a first direction toward the pipe holder and is movable in a second direction away from the pipe holder. The pipe cutter further includes a drive mechanism positioned at least partially within the housing assembly. The drive mechanism is coupled to the cutting mechanism and the motor to move the cutting mechanism from a starting position in the first direction to cut the pipe. The drive mechanism includes a first member operable to disengage a second member to allow movement of the cutting mechanism in the second direction to the starting position. The pipe cutter also includes a spring positioned between the pipe holder and the cutting mechanism. The spring is operable to move the cutting mechanism in the second direction to the starting position when the first member disengages the second member. The pipe cutter further includes a battery pack removably coupled to the housing assembly. The battery pack is electrically coupled to the motor to selectively power the motor to operate the drive mechanism.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein are for the purpose of description and should not be regarded as limiting.

DETAILED DESCRIPTION

Figure 1A:
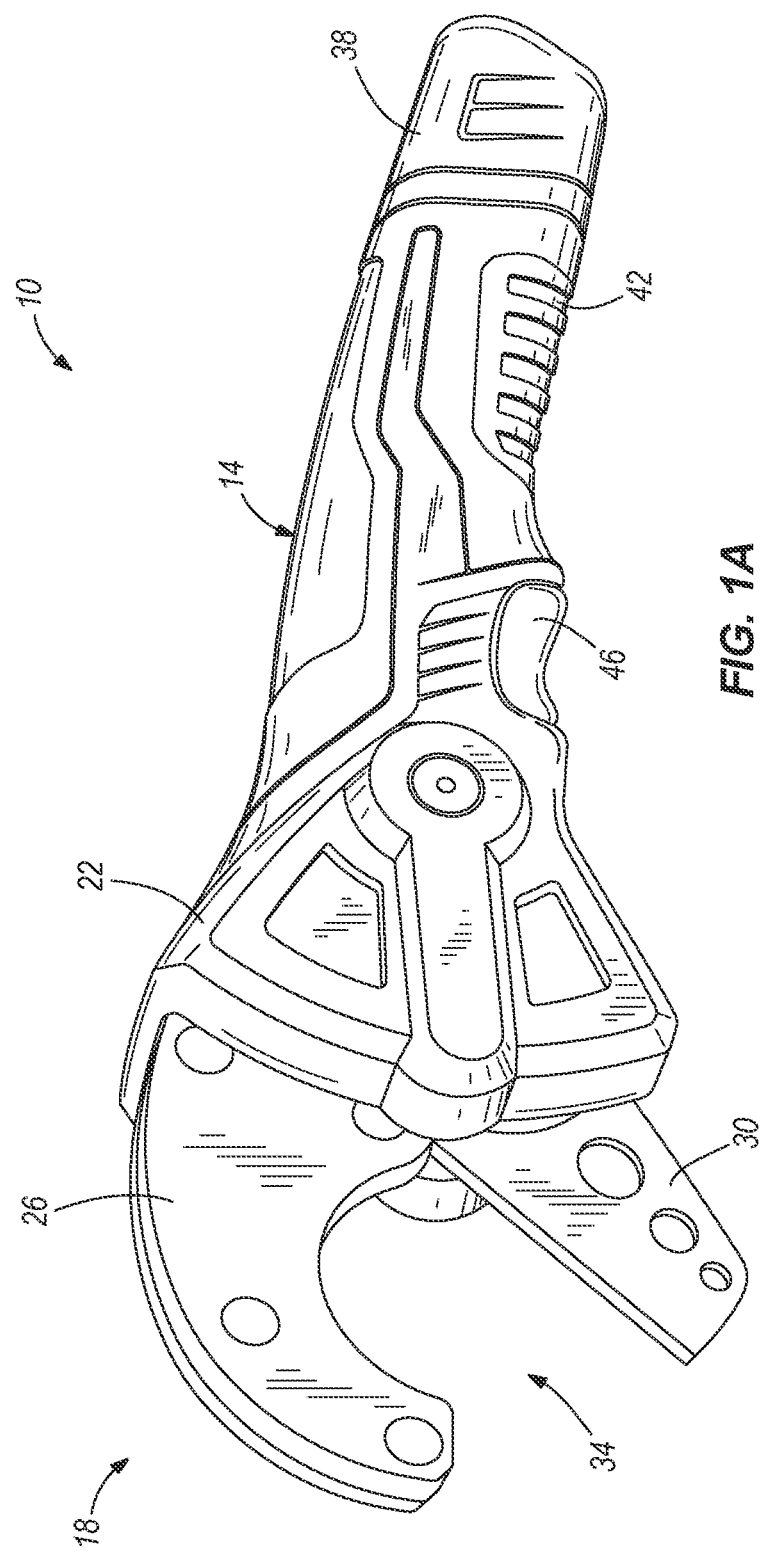
FIG. 1A is a perspective view of a pipe cutter according to one embodiment of the invention.

FIG. 1A illustrates a power tool 10 according to one embodiment of the invention. In the illustrated embodiment, the power tool 10 is a pipe cutter operable to cut a variety of pipes. For example, the illustrated pipe cutter 10 can cut a pipe having a 1½ inch inner diameter or less. In other embodiments, the pipe cutter 10 may be configured to cut a pipe having a diameter greater than 1½ inch. In addition, the illustrated pipe cutter 10 is adapted to cut a polyvinyl chloride (PVC) pipe, although a variety of different types of pipes, such as, for example, other types of plastic pipes, metal pipes, or the like, may also be cut with the pipe cutter 10.

The pipe cutter 10 includes a housing assembly 14, a motor and a drive mechanism (FIG. 3) positioned within the housing assembly 14, and a cutting mechanism 18 coupled to a forward portion 22 of the housing assembly 14. The cutting mechanism 18 includes a pipe holder 26 and a knife 30 defining a slot 34 therebetween. The slot 34 is configured to receive a pipe to be cut by the cutting mechanism 18. The knife 30 is coupled to the motor through the drive mechanism so that operation of the motor moves the knife 30 toward the pipe holder 26 to cut the pipe.

The illustrated pipe cutter 10 also includes a battery pack 38 electrically coupled to the motor such that the pipe cutter 10 is a hand-held, battery-operated power tool. In the illustrated embodiment, the battery pack 38 is a 12-volt power tool battery pack and includes three (3) Lithium-ion battery cells. In other embodiments, the battery pack 38 may include fewer or more battery cells such that the battery pack 38 is a 14.4-volt power tool battery pack, an 18-volt power tool battery pack, or the like. Additionally or alternatively, the battery cells may have chemistries other than Lithium-ion such as, for example, Nickel Cadmium, Nickel Metal-Hydride, or the like. In still other embodiments, the pipe cutter 10 may be a corded power tool.

The battery pack 38, or other power supply, connects to a rearward, or handle, portion 42 of the housing assembly 14 and selectively provides power (e.g., electricity) to the motor to drive the drive mechanism and, thereby, pivot the knife 30. The battery pack 38 is connected to the motor by actuating an actuator 46, or trigger, to selectively drive the motor. In the illustrated embodiment, the battery pack 38 is partially insertable into the handle portion 42 of the housing assembly 14 to electrically couple to the motor, but may alternatively be coupled to the handle portion 42 by, for example, sliding, snapping, rotating, or the like.

Figure 2:
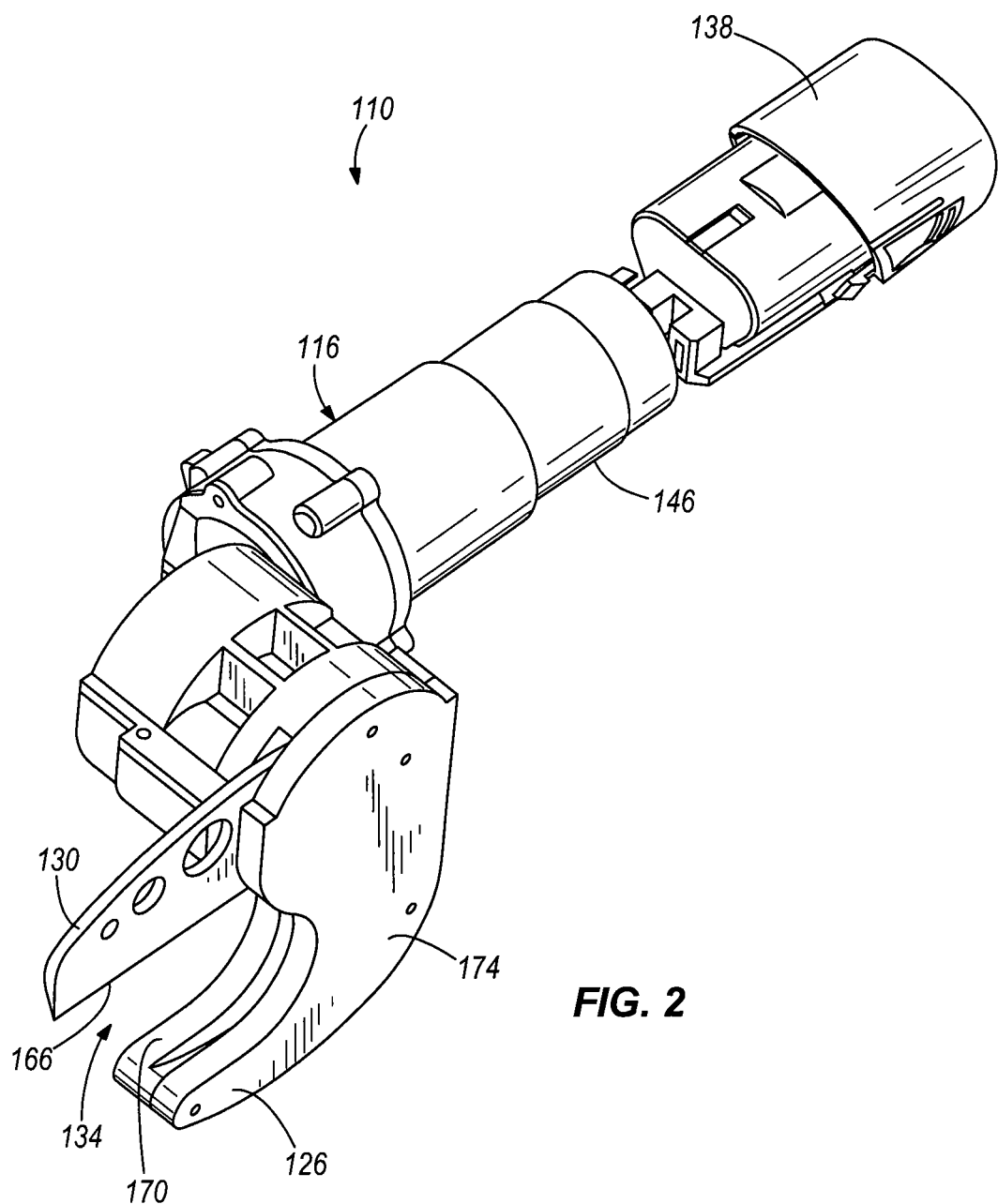
FIG. 2 is a perspective view of a pipe cutter according to yet another embodiment of the invention.

As shown in FIG. 2O, the battery pack 38 is usable with other power tools in addition to the pipe cutter 10. For example, in the illustrated embodiment, the battery pack 38 is also usable with a driver drill 800, a micro-inspection camera 810, a PVC pipe cutter with a wire cutting mechanism 820, an impact driver 830, and a metal pipe cutter 840. Furthermore, the battery pack 38 may be used with other power tools not specifically discussed herein.

Figure 1B:
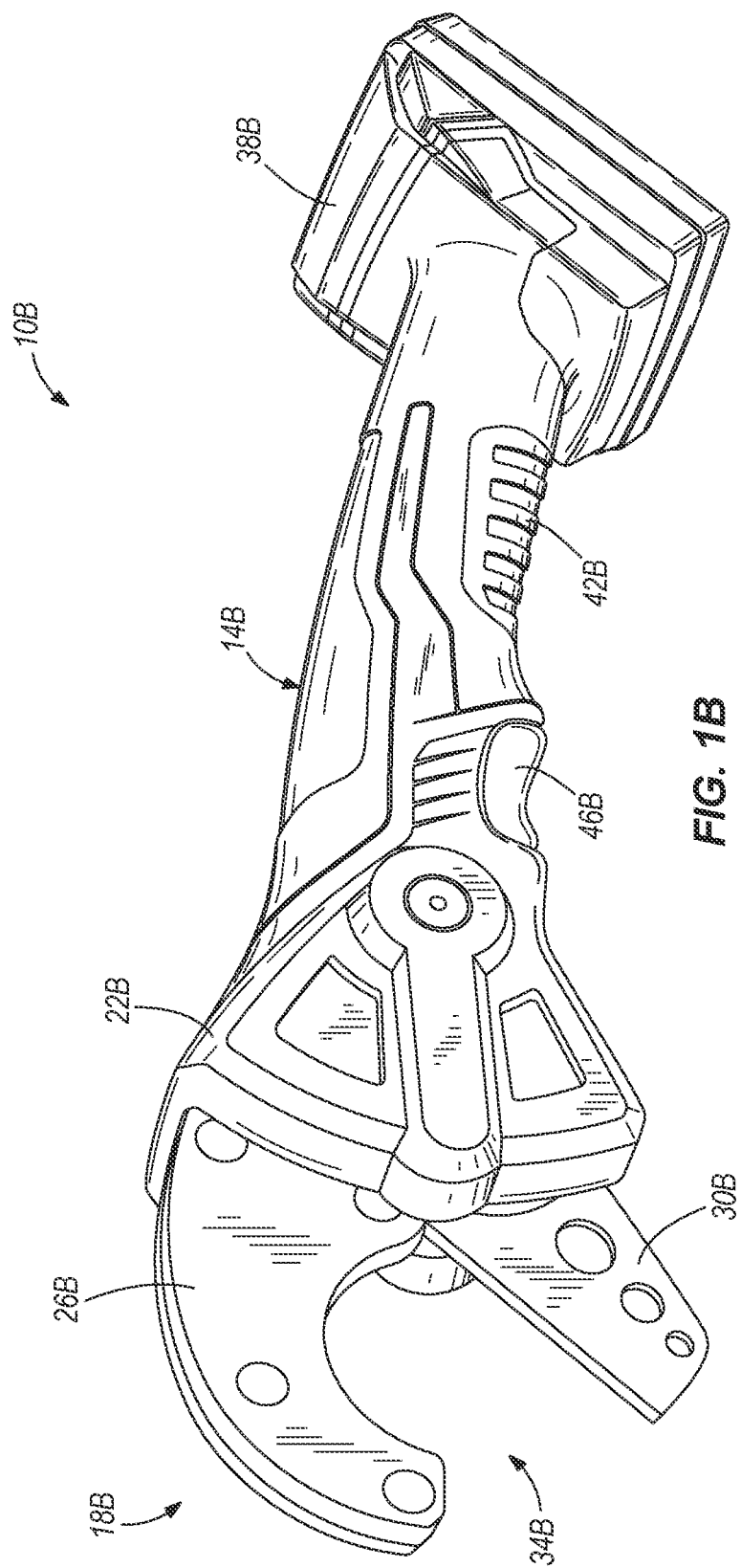
FIG. 1B is a perspective view of a pipe cutter according to another embodiment of the invention.

FIG. 1B illustrates a pipe cutter 10B according to another embodiment of the invention. The illustrated pipe cutter 10B is substantially similar to the pipe cutter 10 shown in FIG. 1A, and like parts have been given the same reference numerals plus a "B" annotation. In the illustrated embodiment, the pipe cutter 10B includes an 18-volt power tool battery pack 38B connected to a handle portion 42B of a housing assembly 14B. The battery pack 38B includes five (5) Lithium-ion battery cells and is coupled to the handle portion 42B by sliding. Similar to the battery pack 38 discussed above, the battery pack 38B may alternatively include fewer or more battery cells, the battery cells may have chemistries other than Lithium-ion, and/or the battery pack 38B may be coupled to the handle portion 42B using other coupling means.

In some embodiments, the pipe cutters 10, 10B may include knife cutting mechanisms not specifically discussed herein. For example, the pipe cutters 10, 10B may include one of the knife cutting mechanisms illustrated and described in International Patent Application Publication No. PCT/US08/69188, entitled "PIPE CUTTER", filed Jul. 3, 2008 by John S. Scott and Michael Naughton, the entire contents of which is hereby incorporated by reference.

In other embodiments, the pipe cutters 10, 10B may include wire cutting mechanisms configured to cut a pipe. For example, the pipe cutters 10, 10B may include one of the wire cutting mechanisms illustrated and described in International Patent Application Publication No. PCT/US08/69209, entitled "PIPE CUTTER", filed Jul. 3, 2008 by John S. Scott, the entire contents of which is hereby incorporated by reference.

FIGS. 2-5 illustrate a pipe cutter 110 according to another embodiment of the invention. Similar to the pipe cutters 10, 10B shown in FIGS. 1A and 1B, the illustrated pipe cutter 110 is a hand-held, battery-operated power tool. As such, like parts have been given the same reference numerals plus 100. In addition, the features, and alternatives to the features, of the pipe cutter 110 described below may be used in the pipe cutters 10, 10B shown in FIGS. 1A and 1B.

The illustrated pipe cutter 110 includes an internal casing 116 positioned within the forward portion 22 and the handle portion 42 of the housing assembly 14 shown in FIGS. 1A and 1B. The internal casing 116 may be composed of a hard plastic material, a metal material, and/or any other material or combination of materials suitable for housing the various components of the pipe cutter 110. The casing 116 houses or supports various mechanical and/or electrical components of the pipe cutter 110 configured for conducting the cutting function of the pipe cutter 110.

Figure 3:
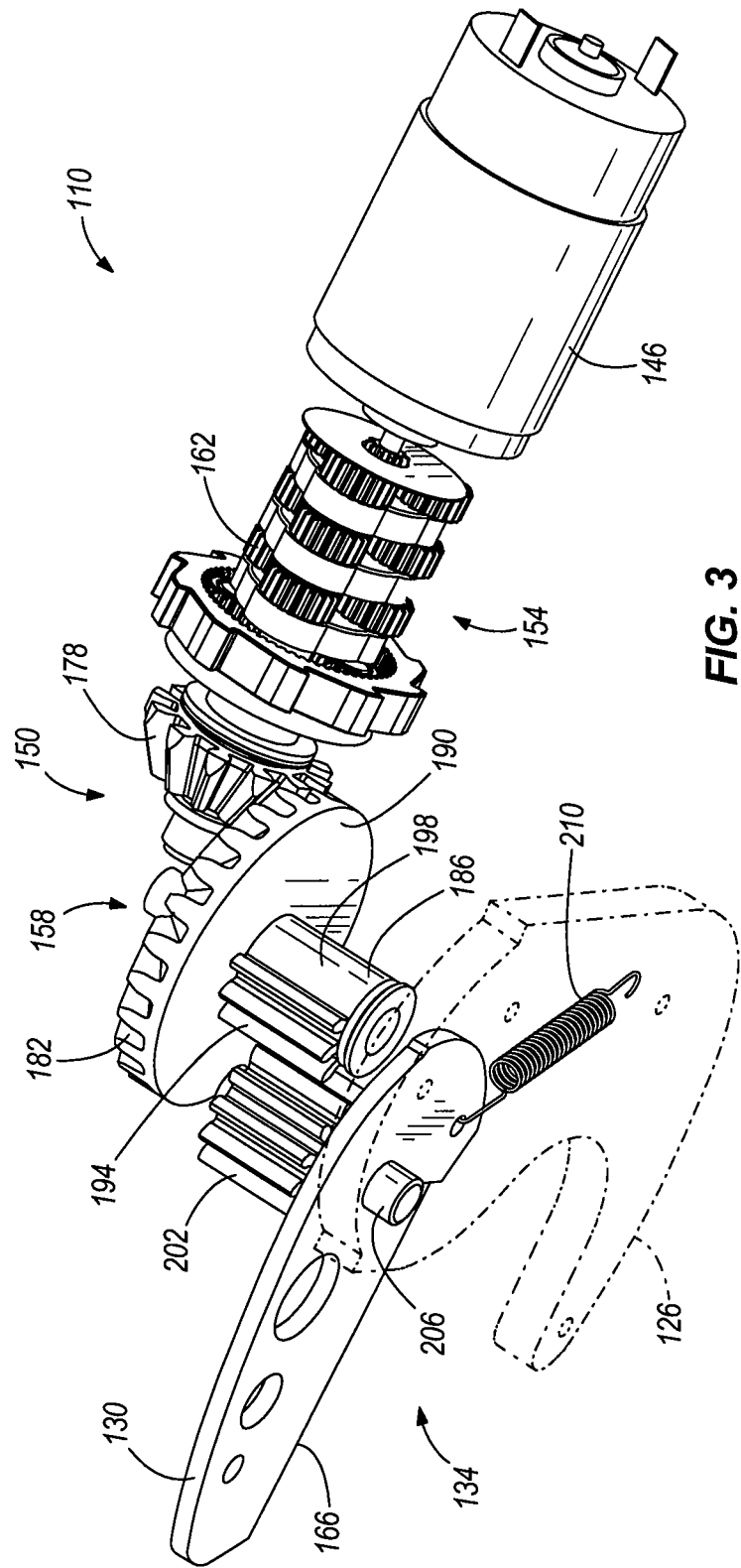
FIG. 3 is a perspective view of the pipe cutter shown in FIG. 2 with housing portions of the pipe cutter removed to illustrate internal gear mechanisms.

In the illustrated embodiment, the handle portion of the housing assembly supports a battery 138, a motor 146, and a drive mechanism 150 (FIG. 3). The pipe cutter 110 is operable to receive power from the battery 138. According to another embodiment, the pipe cutter 110 may be powered by alternating current (AC) power provided via a corded plug electrically coupled to a wall outlet or any number of suitable powering options.

The battery 138, or power supply, is removably coupled to the handle portion to provide, power to the motor 146. In the illustrated embodiment, the battery 138 extends from a rearward end of the handle portion when coupled to the pipe cutter 110. The battery 138 may be coupled to the pipe cutter 110 via any number of suitable means, such as insertion, sliding, snapping, rotating, or other coupling activities. In other embodiments, the battery 138 may be a dedicated battery contained (e.g., partially or entirely housed) within the pipe cutter 110. When coupled to the handle portion, the battery 138 provides power directly to the motor 146 or may power the motor 146 through a control circuit (not shown). The control circuit controls various aspects of the pipe cutter 110, the motor 146, and/or the battery 138 and may also monitor operation of the pipe cutter 110 and its components.

As shown in FIG. 3, the drive mechanism 150 includes a drive assembly 154 and a cutting gear assembly 158. The drive assembly 154 is supported by the handle portion of the pipe cutter 110 and is powered by the motor 146 to drive the cutting gear assembly 158. In the illustrated embodiment, the drive assembly 154 includes a four-stage planetary gear reduction 162. In other embodiments, the drive assembly 154 may include different gear reductions. In yet another embodiment, the drive assembly 154 may include another type of gear configuration suitable to drive the cutting operation of the pipe cutter 110.

In the illustrated embodiment, the casing 116 supports the cutting gear assembly 158, a knife 130, and a pipe holder 126. The cutting gear assembly 158 is driven by the drive assembly 154 and operates to control cutting motion of the knife 130, which performs the cutting action of the pipe cutter 110. The knife 130 includes a blade 166 and is pivotally movable relative to the housing assembly 14 (FIGS. 1A and 1B), the casing 116, and the pipe holder 126. The knife 130 is formed from a hardened metal material suitable to cut pipes of various materials and of a size sufficient to cut through a desired pipe size. Together, the knife 130 and the pipe holder 126 define a slot 134 for receiving a pipe to be cut. The pipe holder 126, which is stationary relative to the housing assembly 14, is formed with a curved surface 170 facing the blade 166 of the knife 130. The curved surface 170 of the pipe holder 126 provides support for a pipe during the cutting action and helps to align the pipe to be cut. The pipe holder 126 may be integrally formed with the housing assembly 14 or may be separately coupled to the forward portion 22 of the housing assembly 14. The pipe holder 126 is formed from a hard plastic material, a metal material, and/or any other material or combination of materials suitable for supporting a pipe during the cutting activity.

In the illustrated embodiment, the pipe holder 126 includes a cover 174 that forms an exterior portion of the pipe cutter 110 and houses various mechanical and/or electrical components of the pipe cutter 110. The cover 174 may be integrally formed with the housing assembly 14, may be removably coupled to the forward portion 22, or may be permanently coupled to the forward portion 22. The cover 174 may be formed from a hard plastic material, a metal material, and/or any other material or combination of materials suitable for housing the various components of the pipe cutter 110. In the illustrated embodiment, the cover 174 is coupled to the forward portion 22 of the housing assembly 14 and the pipe holder 126. The portion of the cover 174 that is coupled to the holder 126 is formed with a curved surface of the same shape as the curved surface 170 of the pipe holder 126 such that the pipe holder 126 and the cover 174 cooperate to support a pipe during the cutting motion.

Figure 4:
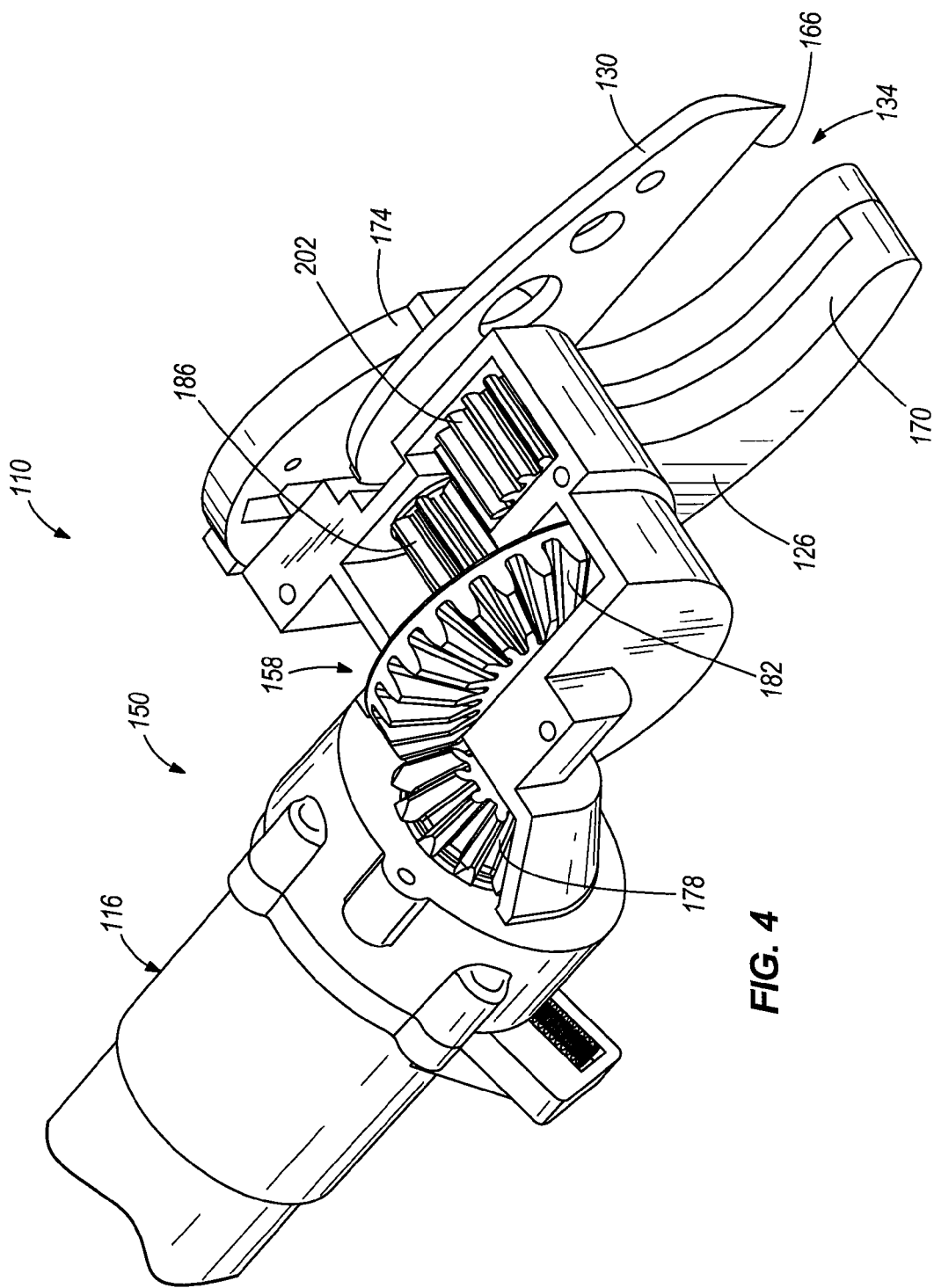
FIG. 4 is a perspective view of a portion of the pipe cutter shown in FIG. 2 with housing portions of the pipe cutter removed to illustrate internal gear mechanism.
Figure 5:
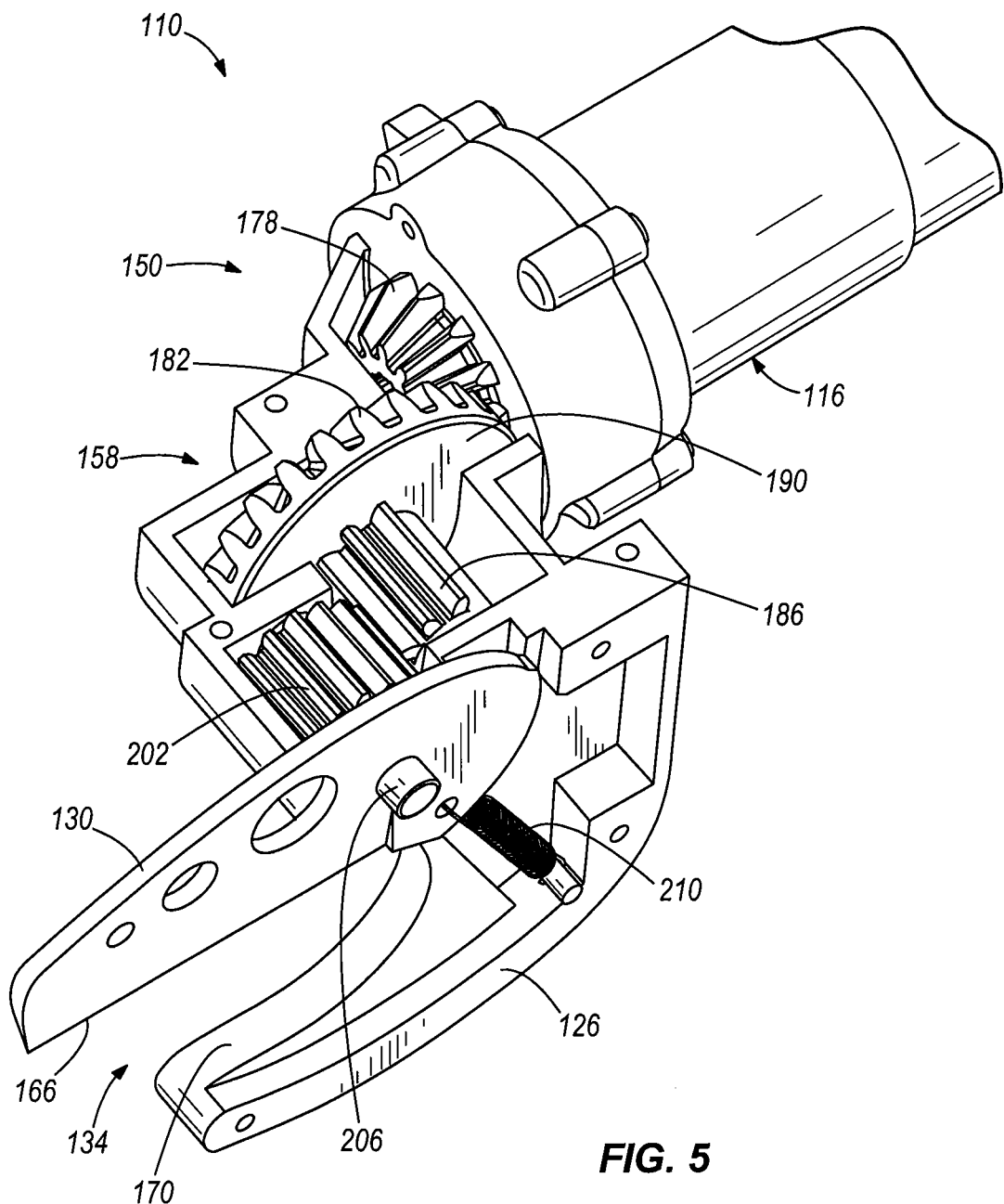
FIG. 5 is another perspective view of the portion of the pipe cutter shown in FIG. 4.

The cutting gear assembly 158 is coupled to and driven by the drive assembly 154 to pivot the knife 130 of the pipe cutter 110. The cutting gear assembly 158 may include various numbers of gears in various configurations. Referring to FIGS. 3-5, the cutting gear assembly 158 includes a first gear 178 driven by the drive assembly 154 and a second gear 182, whereby the first gear 178 engages and drives the second gear 182. In the illustrated embodiment, the first gear 178 and the second gear 182 are bevel gears, although in further embodiments, the first and second gears 178, 182 may be other types of gears.

Figure 6:
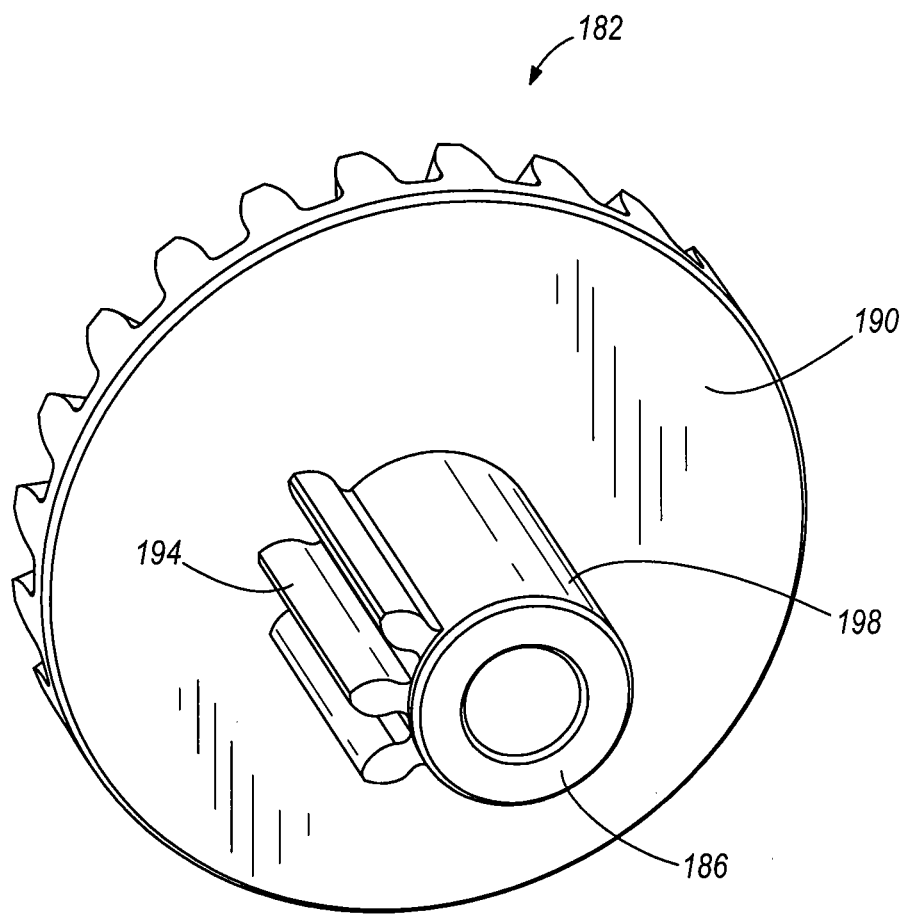
FIG. 6 is a perspective view of a bevel gear with a spline for use in the pipe cutter shown in FIG. 2.

The second gear 182 includes a spline 186 (also shown in FIG. 6), or spur gear, that extends outward from a rear face 190 of the second gear 182. The spline 186 may be integrally formed with the second gear 182 or may be separately coupled to the second gear 182. The spline 186 includes a toothed portion 194 and a non-toothed portion 198. The spline 186 may include teeth formed on less than half of the circumference of the spline 186. In the illustrated embodiment, the teeth are formed on approximately 90° of the spline 186 circumference, which will result in the knife 130 pivoting 90° during the cutting motion, as discussed below. In embodiments in which the knife 130 pivots less than 90°, the teeth are formed on less than 90° of the spline 186 circumference. Alternatively, in embodiments in which the knife 130 pivots more than 90°, the teeth are formed on more than 90° of the spline circumference.

The cutting gear assembly 158 includes a third gear 202, which is a driven gear that causes the cutting motion of the knife 130. In the illustrated embodiment, the third gear 202 intermeshes with and is driven by the toothed portion 194 of the spline 186; however, the non-toothed portion 198 of the spline 186 does not engage the third gear 202.

Referring to FIGS. 2-5, one end of the knife 130 is rotatably coupled to the third gear 202 at a pivot point defined by a gear shaft 206. The knife 130 is normally biased upward and away from the pipe holder 126 to a first, or starting, position for receiving a pipe within the slot 134. A spring 210 (FIGS. 3 and 5) extends between the knife 130 and the pipe holder 126 to bias the knife 130 to the first position. In the illustrated embodiment, the spring 210 is an extension spring attached to the internal casing 116 at one end and to the knife 130 at an opposite end. In other embodiments, other suitable biasing members may be positioned within the internal casing 116 between the knife 130 and the pipe holder 126 to bias the knife 130 to the starting position. As the third gear 202 rotates, the knife 130 pivots about the pivot point toward the pipe holder 126. The degree that the knife 130 pivots corresponds with the angular distance of the toothed portion 194 of the spline 186. In the illustrated embodiment, the cover 174 encloses an interior area of the pipe holder 126, which contains the spring 210 and the pivot point.

During operation of the pipe cutter 110, a user positions a pipe in the slot 134 such that the pipe rests on or is positioned beneath the curved surface 170 of pipe holder 126. A user electrically couples the power supply 138 to the motor 146 (e.g., by actuating a switch assembly or circuit) to power the motor 146 and, thereby, drive the drive assembly 154. The drive assembly 154 intermeshes with and drives the first gear 178 of the cutting gear assembly 158, which rotates the second gear 182. As the second gear rotates 182, the spline 186 also rotates. When the toothed portion 194 of the spline 186 engages the third gear 202, the third gear 202 rotates to pivot the knife 130.

As the third gear 202 rotates, the knife 130 pivots toward the pipe holder 126 such that the blade 166 of the knife 130 cuts through a pipe (not shown) positioned in the slot 134. The pivot range of the knife 130 corresponds to the arc length of the toothed portion 194 on the spline 186. In the illustrated embodiment, after the toothed portion 194 of the spline 186 rotates past the third gear 202, the knife 130 will have completed the pipe cut and cutting motion. When the non-toothed portion 198 of the spline 186 is adjacent to the third gear 202, the spline 186 and the third gear 202 do not engage such that the spring 210 (FIGS. 3 and 5) biases the knife 130 away from the pipe holder 126 to the first position. The knife 130 is then in position for the next cutting operation.

Figure 7:
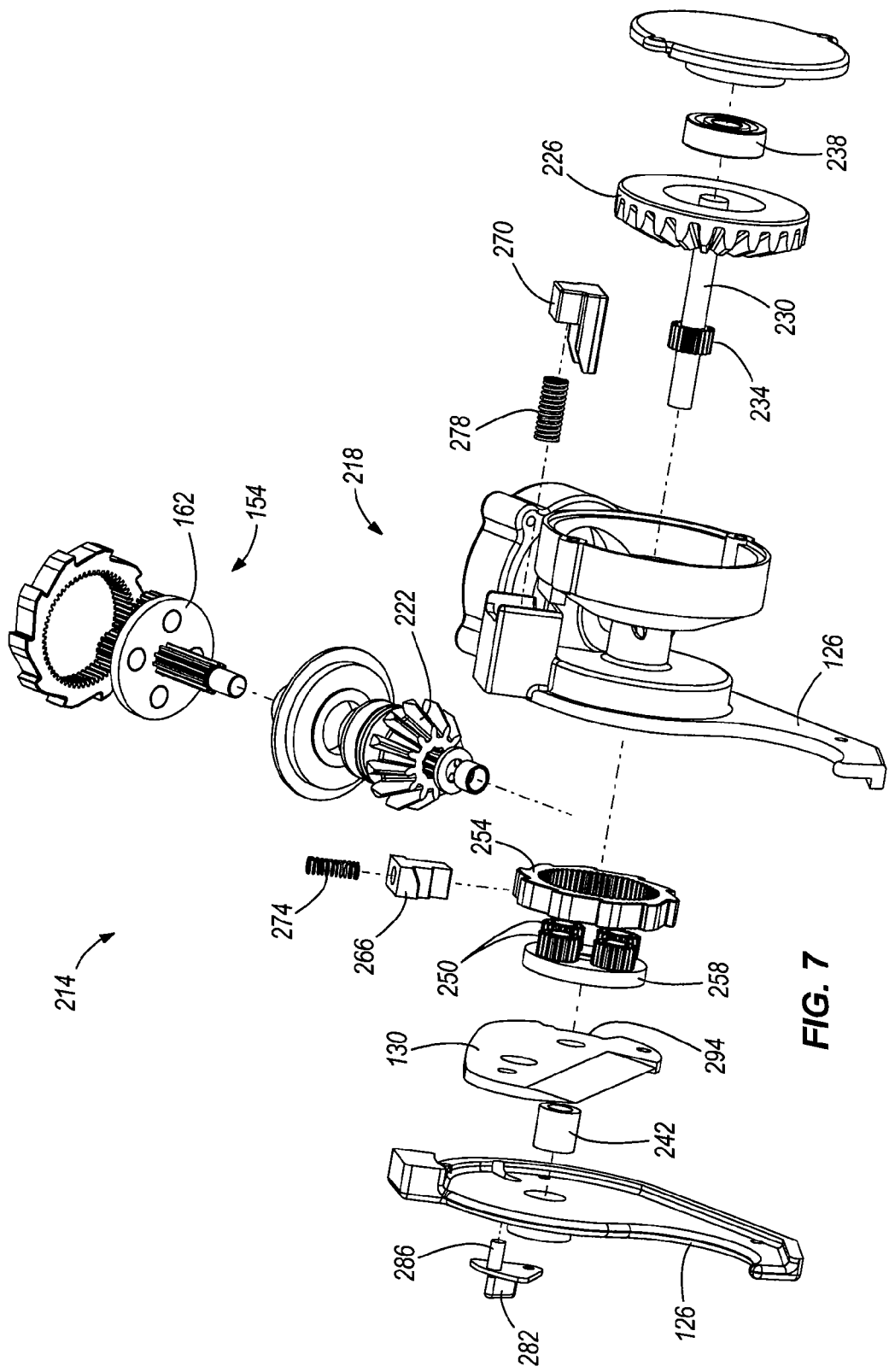
FIG. 7 is an exploded perspective view of a portion of a pipe cutter according to yet another embodiment of the invention.
Figure 8:
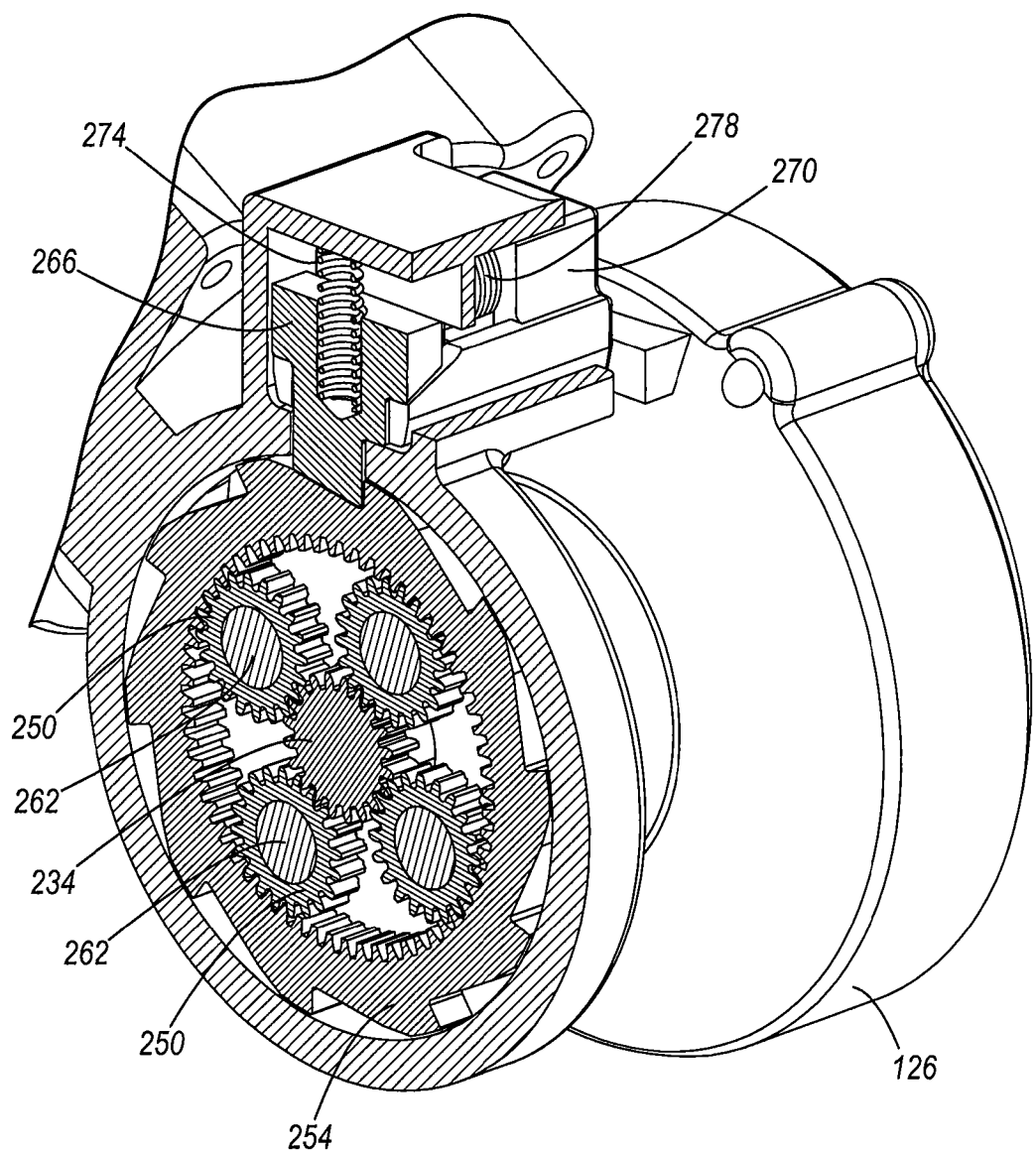
FIG. 8 is a cross-sectional view of the portion of the pipe cutter shown in FIG. 7 with a lock key in an engaged position.
Figure 9:
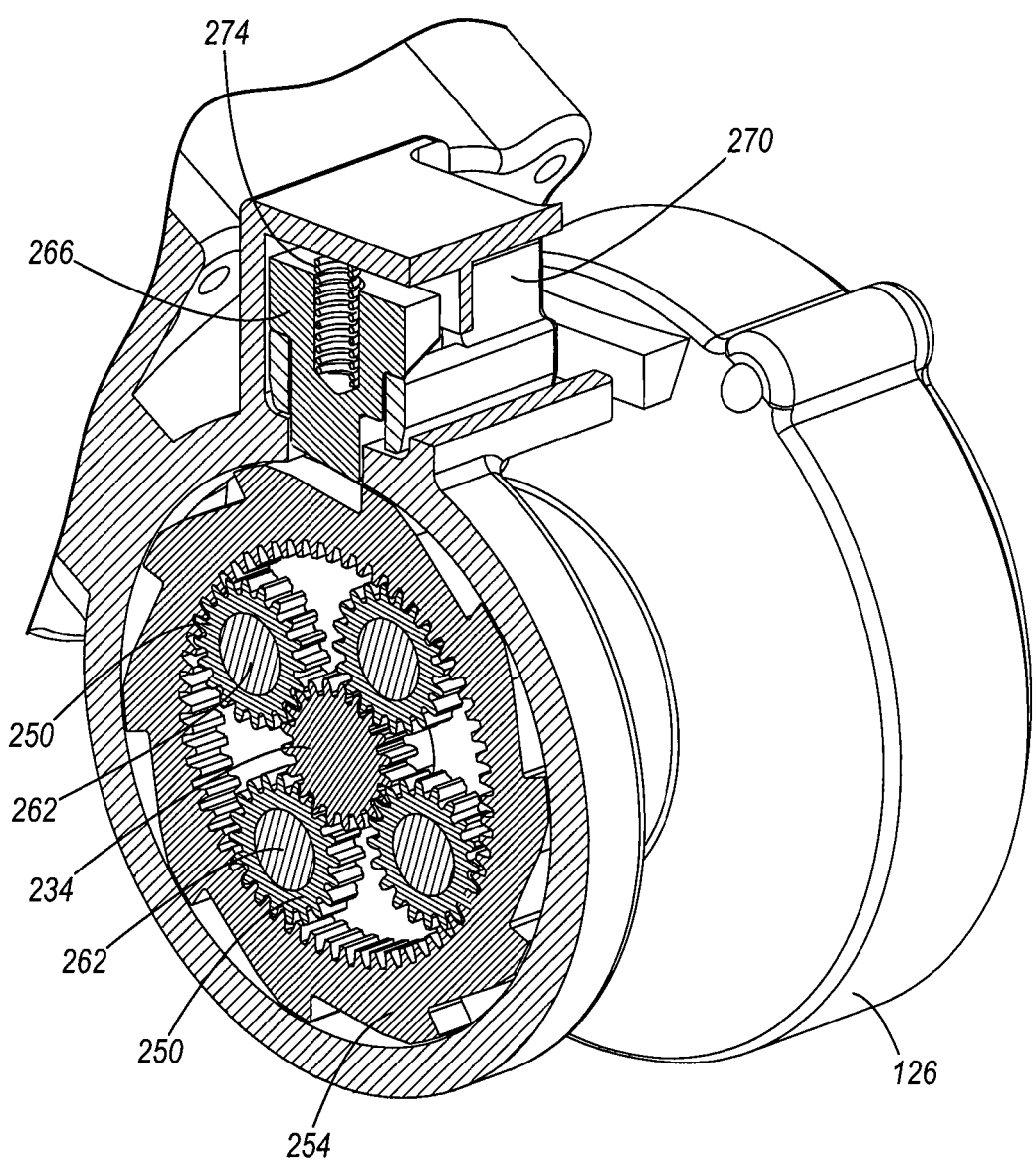
FIG. 9 is a cross-sectional view of the portion of the pipe cutter shown in FIG. 7 with the lock key in a disengaged position.

FIGS. 7-9 illustrate another embodiment of a drive mechanism 214 for use with the pipe cutters 10, 10B, 110 of FIGS. 1A-5. The drive mechanism 214 includes the drive assembly 154 shown in FIG. 3, but includes another gear assembly 218 to pivot the knife 130 relative to the pipe holder 126. The illustrated gear assembly 218 includes a first gear 222 driven by the drive assembly 154 and a second gear 226, whereby the first gear 222 engages and drives the second gear 226. In the illustrated embodiment, the first gear 222 and the second gear 226 are bevel gears, although in further embodiments, the first and second gears 222, 226 may be other types of gears.

As shown in FIGS. 7-9, the second gear 226 includes an elongated shaft 230 having a spline 234. The elongated shaft 230 extends axially outward from the second gear 226 through the knife 130. Bearings 238, 242 are positioned about opposite ends of the shaft 230 to support and guide the shaft 230 during rotation.

The gear assembly 218 also includes a planetary gear reduction 246. The planetary gear reduction 246 is positioned about the elongated shaft 230 and includes four planetary gears 250, a ring gear 254, and a driven gear 258. The spline 234 engages the planetary gears 250 such that, as the second gear 226 is rotated, the planetary gears 250 move about the shaft 230 within the ring gear 254. The driven, or output, gear 258 is coupled to the planetary gears 250 via short rods 262 (FIGS. 8 and 9) such that the driven gear 258 rotates as the planetary gears 250 move within the ring gear 254. The driven gear 258 also engages the knife 130 to output rotation of second gear 226 to the knife 130 at a reduced speed. In some embodiments, the four-stage planetary gear reduction 162 of the drive assembly 154 may be omitted or modified since the planetary gear reduction 246 in the gear assembly 218 also reduces the speed of rotation from the motor 146.

In the illustrated embodiment, the drive mechanism 218 includes a lock key 266 and a key release button 270. As shown in FIG. 8, the lock key 266 is biased by a spring 274 to engage the ring gear 254 to prevent rotation of the ring gear 254 relative to the pipe holder 126. In this position, the planetary gear reduction 246 transmits rotation of the second gear 226 to the knife 130. The key release button 270, or actuator, is positioned adjacent to the lock key 266 and extends partially out of the pipe holder 126. A spring 278 biases the button 270 slightly apart from the lock key 266 such that the button 270 does not disengage the lock key 266 from the ring gear 254.

Referring to FIG. 9, when the key release button 270 is depressed by a user against the bias of the spring 278, the button 270 lifts the lock key 266 out of engagement with the ring gear 254. In this position, the ring gear 254 can rotate relative to the pipe holder 126 such that rotation of the second gear 226 is not transmitted to the knife 130, and rotation of the knife 130 is not transmitted to the second gear 226. The user can thereby manually pivot the knife 130 away from the pipe holder 126 to the starting position without having to reverse the motor 146. In some embodiments, a biasing member, such as the extension spring 210 shown in FIGS. 3 and 5, may be positioned between the pipe holder 126 and the knife 130 to automatically bias the knife 130 to the starting position.

As shown in FIG. 7, the drive mechanism 218 also includes a size switch 282 coupled to the pipe holder 126. The size switch 282 allows a user to limit the size of the slot 134 (FIG. 2) by only allowing the knife 130 to pivot apart from the pipe holder 126 at set increments. In the illustrated embodiment, the size switch 282 includes a pin 286 extending through a curved slot 290 in the pipe holder 126. The pin 286 engages a stepped surface 294 formed on the knife 130 to limit the pivot range, and thereby the starting position, of the knife 130 relative to the pipe holder 126. In the illustrated embodiment, the stepped surface 294 of the knife 130 includes three steps such that the user can limit the size of the slot 134 to one of three sizes. In other embodiments, the stepped surface 294 can include fewer or more steps to limit the size of the slot 134 to larger and/or smaller sizes, or the stepped surface 294 may be formed to allow for continuous resizing of the slot 134.

Figure 10:
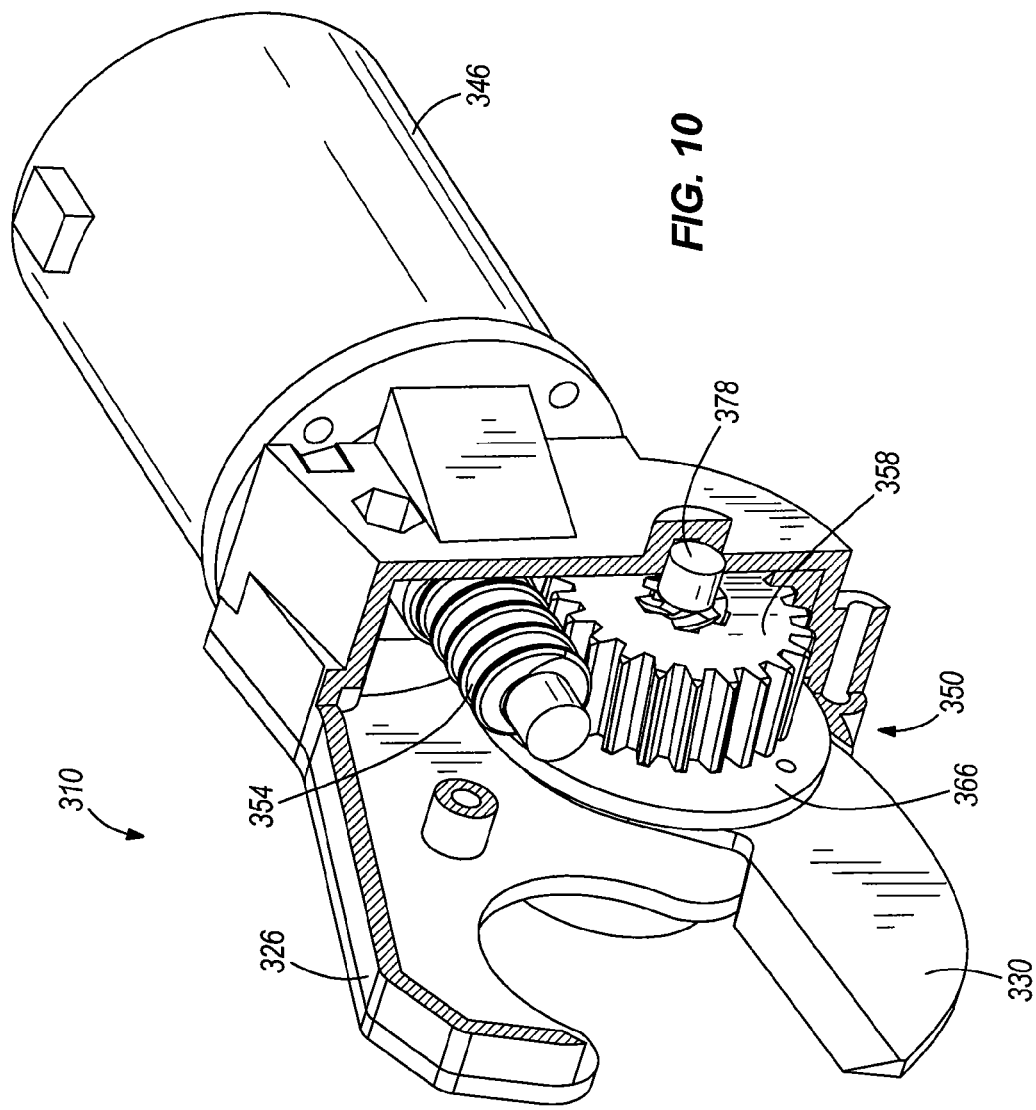
FIG. 10 is a perspective view of a portion of a pipe cutter according to still another embodiment of the invention, the pipe cutter having housing portions removed to illustrate internal gear mechanisms.
Figure 11:
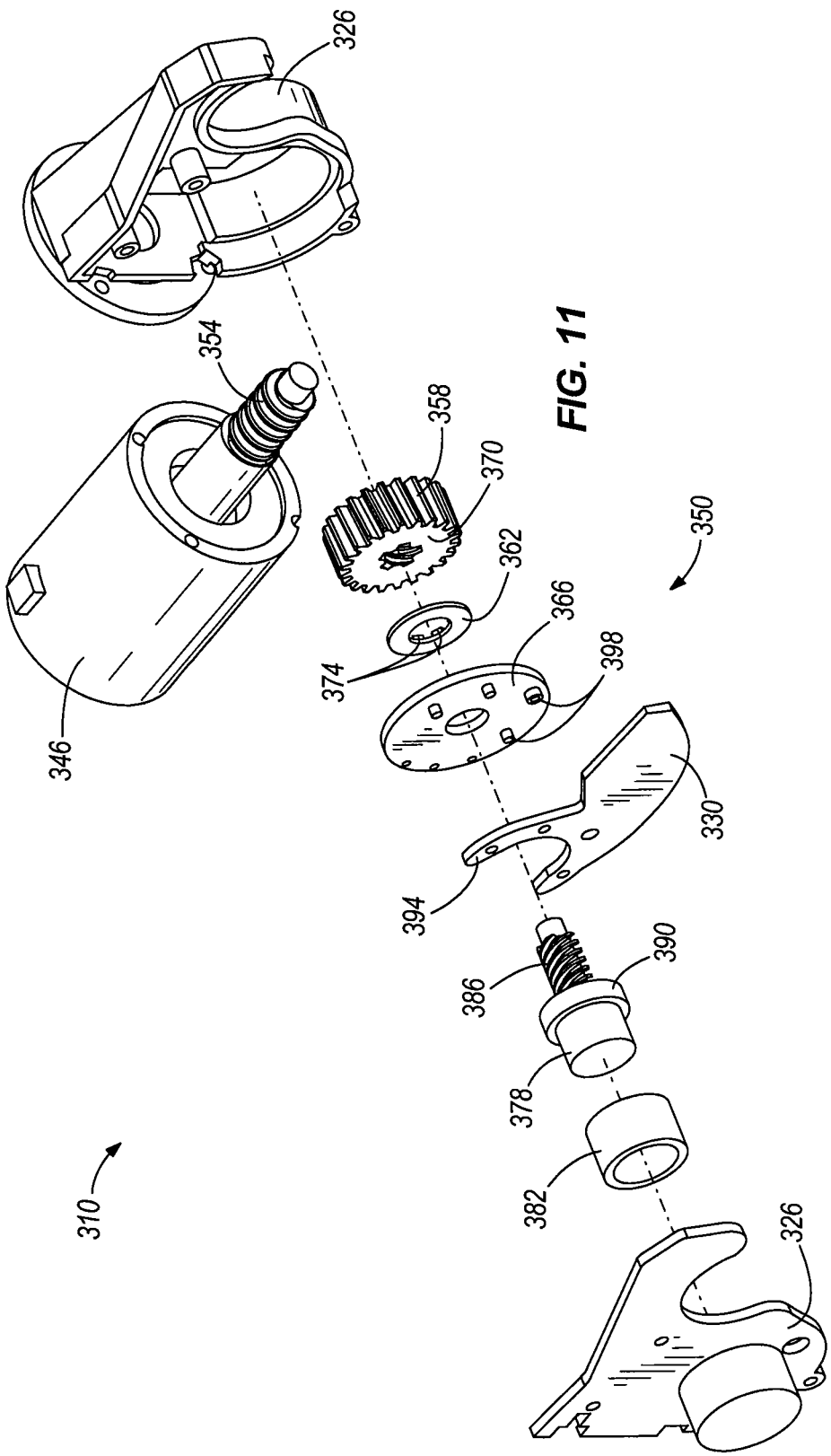
FIG. 11 is an exploded perspective view of the portion of the pipe cutter shown in FIG. 10.
Figure 12:
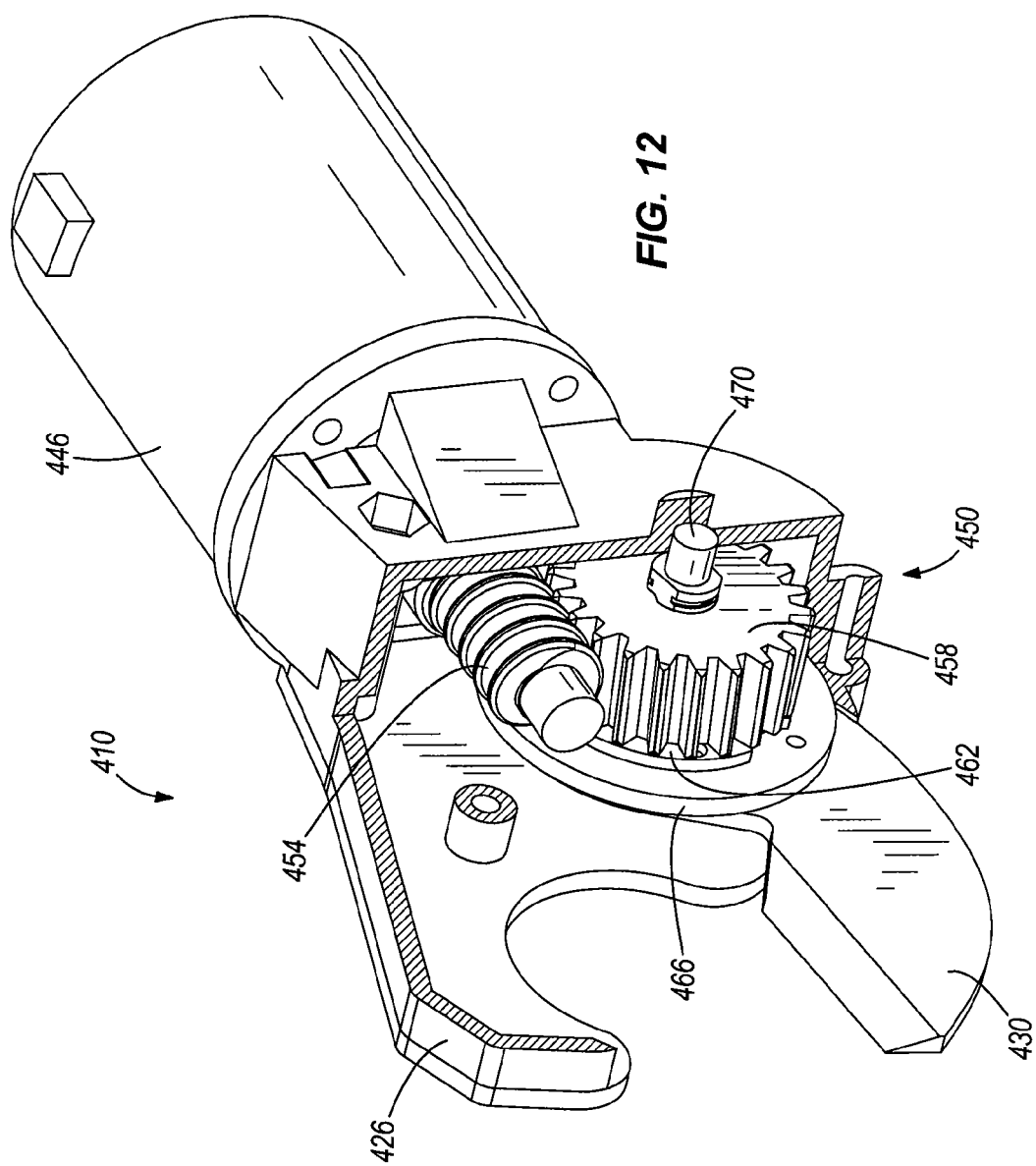
FIG. 12 is a perspective view of a portion of a pipe cutter according to still another embodiment of the invention, the pipe cutter having housing portions removed to illustrate internal gear mechanisms.

FIGS. 10 and 11 illustrate yet another embodiment of a pipe cutter 310. Similar to the pipe cutters 10, 10B, 110 of FIGS. 1A-5, the illustrated pipe cutter 310 includes a pipe holder 326, a knife 330, a motor 346, and a drive mechanism 350. In the illustrated embodiment, the drive mechanism 350 includes a spindle 354 extending from the motor 346, a gear 358 coupled to the spindle 354, a disc 362 supported by the gear 358, and a knife support 366 coupled to the knife 330. The spindle 354 is driven by the motor 346 and engages the gear 358 to transmit rotation of the motor 346 to the gear 358. The disc 362 is mounted to a face 370 of the gear 358 and includes tabs 374 extending into the gear 358 such that the disc 362 rotates with the gear 358. In some embodiments, the drive mechanism 350 may include a gear reduction mechanism positioned between the spindle 354 and the gear 358 and/or between the motor 346 and the spindle 354.

The drive mechanism 350 also includes a shaft 378 positioned within the pipe holder 326 and extending through the gear 358, the disc 362, and the knife support 366. A bearing 382 is positioned about an end of the shaft 378 to support the shaft 378 during rotation. The illustrated shaft 378 includes a threaded portion 386 and a flange portion 390. The gear 358 includes internal threads to threadably couple to the threaded portion 386 of the shaft 378. As the gear 358 is rotated, the gear 358 moves axially along the threaded portion 386 toward and away from the flange portion 390, depending on the direction of operation of the motor 346. For example, operating the motor 346 in a forward direction moves the gear 358 toward the flange portion 390, while operating the motor 346 in a reverse direction moves the gear 358 away from the flange portion 390.

The knife support 366 is positioned about the threaded portion 386 of the shaft 378 between the disc 362 and the flange portion 390 of the shaft 378. In the illustrated embodiment, the knife support 366 rotates with the shaft 378 when the disc 362 frictionally engages the knife support 366 and is rotatable relative to the shaft 378 when the disc 362 disengages the knife support 366, as further described below.

The illustrated knife 330 includes a generally U-shaped portion 394 that partially surrounds the flange portion 390 of the shaft 378 adjacent to the knife support 366. In the illustrated embodiment, the knife support 366 includes a plurality of projections 398 extending axially through the U-shaped portion 394 of the knife 330 to couple the knife support 366 to the knife 330. The knife 330 is thereby pivoted relative to the pipe holder 326 when the knife support 366 rotates. In other embodiments, other suitable coupling means may be employed to couple the knife support 366 to the knife 330.

When the motor 346 is operated in the forward direction, the gear 358 is rotated by the spindle 354 to thread further onto the threaded portion 386 of the shaft 378 and, thereby, move axially toward the flange portion 390. The gear 358 moves axially along the threaded portion 386 until the disc 362 tightly engages the knife support 366. Once the disc 362 tightly (e.g., frictionally) engages the knife support 366, the gear 358 no longer moves axially along the threaded portion 386, but begins rotating the shaft 378 relative to the pipe holder 326. In addition, the knife support 366 is captured between the flange portion 390 and the disc 362 such that the knife support 366 rotates relative to the pipe holder 326 with the gear 358 and the shaft 378. As the knife support 366 rotates, the knife 330 is pivoted from a starting position (FIG. 10) toward the pipe holder 326 to cut a pipe supported by the pipe holder 326.

When the motor 346 is operated in the reverse direction, the gear 358 is rotated by the spindle 354 to unthread from the threaded portion 386 of the shaft 378 and, thereby, move axially away from the flange portion 390. As the gear 358 moves away from the flange portion 390, the disc 362 also moves axially away from the knife support 366 such that the disc 362 no longer tightly engages the knife support 366. Once the disc 362 has sufficiently disengaged the knife support 366, the knife support 366 can rotate relative to the gear 358 and the shaft 378, allowing the knife 330 to return to the starting position without further operation of the motor 346 in the reverse direction. In some embodiments, the knife 330 can be pivoted away from the pipe holder 326 manually. In other embodiments, the knife 330 can be pivoted away from the pipe holder 326 automatically with a biasing member, such as the extension spring 210 shown in FIGS. 3 and 5.

FIGS. 12-15 illustrate still another embodiment of a pipe cutter 410. Similar to the pipe cutters 10, 10B, 110, 310 of FIGS. 1A-5 and 10-11, the illustrated pipe cutter 410 includes a pipe holder 426, a knife 430, a motor 446, and a drive mechanism 450. In the illustrated embodiment, the drive mechanism 450 includes a spindle 454 extending from the motor 446, a first gear 458 engaging the spindle 454, a second gear 462 coupled to the first gear 458, and a third gear 466 positioned about the second gear 462. The drive mechanism 450 also includes a shaft 470 having a generally non-cylindrical portion 474 and a flange 478. The non-cylindrical portion 474 extends through the gears 458, 462, 466 such the shaft 470 rotates with the first gear 458 and the second gear 462 relative to the pipe holder 426. A bearing 482 is positioned about an end of the shaft 470 to support the shaft 470 during rotation.

Figure 13:
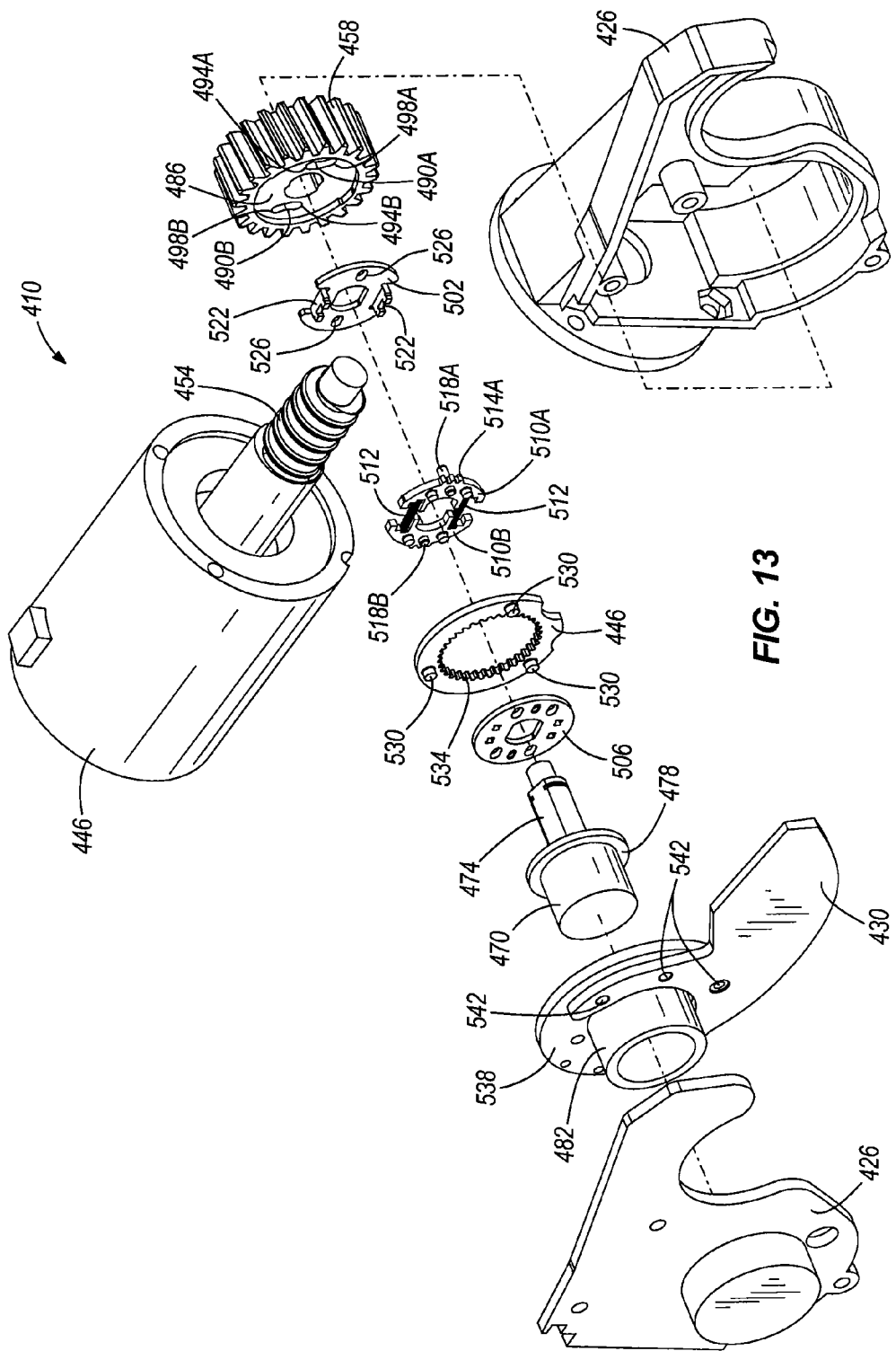
FIG. 13 is an exploded perspective view of the portion of the pipe cutter shown in FIG. 12.

The first gear 458 intermeshes with the spindle 454 to rotate with the spindle 454 when the motor 446 is operated. As shown in FIG. 13, the first gear 458 includes a recessed surface 486 and defines two slots 490A, 490B in the recessed surface 486. In some embodiments, the first gear 458 may define fewer or more slots. Each slot 490A, 490B has a generally dog-legged shape and includes a radial inner portion 494A, 494B and a radial outer portion 498A, 498B. The outer portions 498A, 498B are angled, or sloped, relative to the inner portions 494A, 494B to define the dog-legged shape of the slots 490A, 490B.

Figure 14:
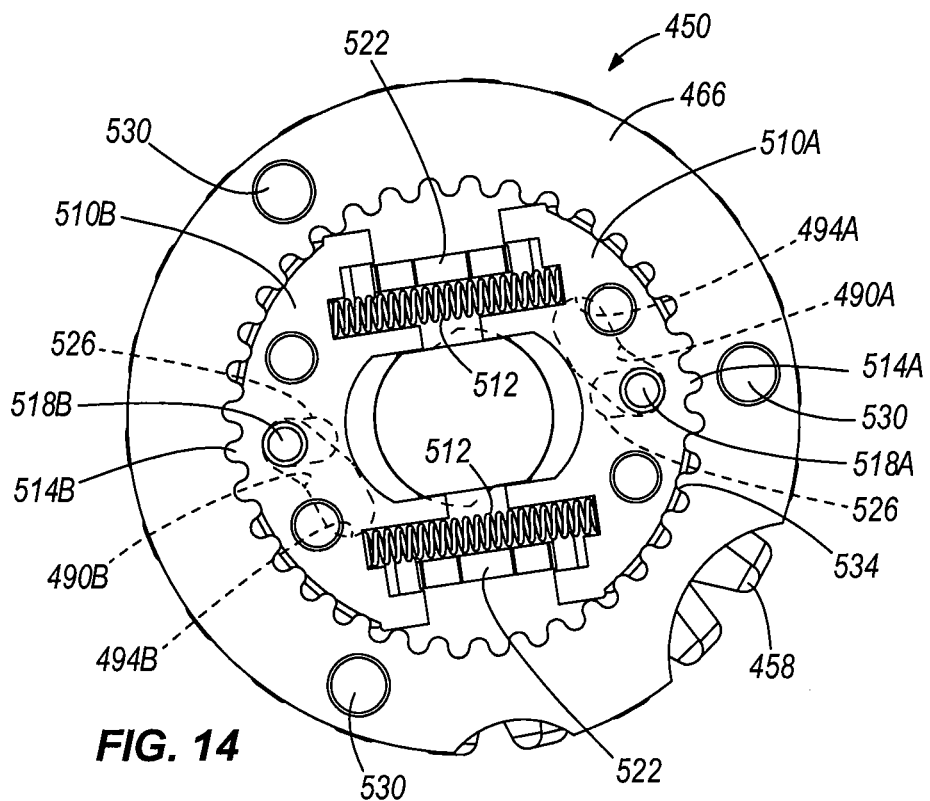
FIG. 14 is an end view of a portion of a drive mechanism for use with the pipe cutter shown in FIG. 12, the drive mechanism being in an engaged position.
Figure 15:
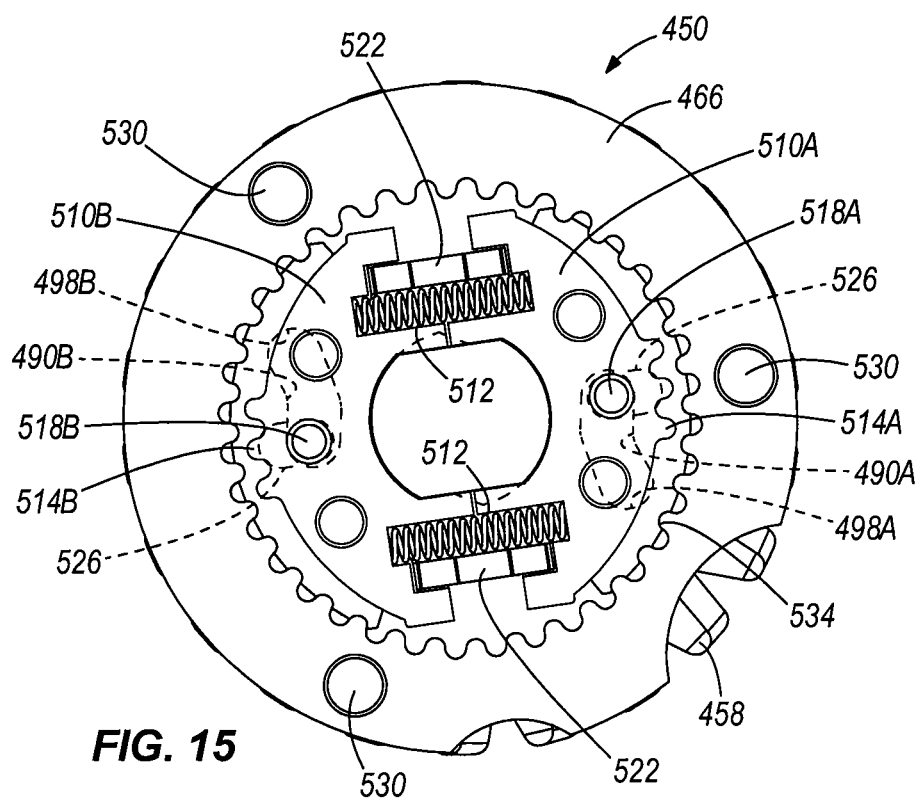
FIG. 15 is an end view of the portion of the drive mechanism shown in FIG. 14 in a disengaged position.

The illustrated second gear 462 includes a first outer casing 502, a second outer casing 506, and two gear portions 510A, 510B positioned between the casings 502, 506. The gear portions 510A, 510B are coupled together with two biasing members 512 (e.g., coil springs) that bias the gear portions 510A, 510B apart from one another. Each gear portion 510A, 510B includes three teeth 514A, 514B formed on an outer perimeter of the gear portion 510A, 510B and a pin 518A, 518B extending axially toward the first gear 458. In other embodiments, each gear portion 510A, 510B may include fewer or more teeth formed on the outer perimeter of the gear portion 510A, 510B. The pins 518A, 518B extend into the corresponding slots 490A, 490B in the first gear 458 and are movable within the slots 490A, 490B between the inner portions 494A, 494B and the outer portions 498A, 498B. When the pins 518A, 518B are positioned within the outer portions 498A, 498B of the slots 490A, 490B, the gear portions 510A, 510B are biased apart from one another to a spread position (FIG. 14). When the pins 518A, 518B are positioned within the inner portions 494A, 494B of the slots 490A, 490B, the gear portions 510A, 510B are moved toward one another to a collapsed position (FIG. 15). The first outer casing 502 includes tabs 522 and clearance grooves 526 to help limit the range of movement of the gear portions 510A, 510B between the spread and collapsed positions.

The third gear 466 is a ring gear that surrounds the gear portions 510A, 510B of the second gear 462. The illustrated third gear 466 includes three pins 530 extending axially away from the first gear 458 and a series of teeth 534 extending radially inward to engage the teeth 514A, 514B on the gear portions 510A, 510B. When the gear portions 510A, 510B are in the spread position (FIG. 14), the teeth 514A, 514B on the gear portions 510A, 510B engage the teeth 534 of the third gear 466 to transmit rotation from the second gear 462 to the third gear 466. When the gear portions 510A, 510B are in the collapsed position (FIG. 15), the teeth 514A, 514B on the gear portions 510A, 510B are spaced apart from the teeth 534 of the third gear 466, allowing relative rotation between the second gear 462 and the third gear 466.

The drive mechanism 450 also includes a knife support 538 positioned about the flange 478 of the shaft 470 and coupled to the third gear 466. In the illustrated embodiment, the knife support 538 is coupled to the third gear 466 by the pins 530 extending axially from the third gear 466 such that rotation of the third gear 466 is transmitted to the knife support 538. The illustrated knife support 538 includes pins 542 extending axially away from the third gear 466 to also couple the knife support 538 to the knife 430. In other embodiments, the knife support 538 may be coupled to the third gear 466 and/or the knife 430 using other suitable coupling means.

Similar to the motor 346 shown in FIGS. 10 and 11, the illustrated motor 446 is operable in a forward direction and a reverse direction. When the motor 446 is operated in the forward direction, the first gear 458 is rotated by the spindle 454 such that the pins 518A, 518B of the gear portions 510A, 510B move to the outer portions 498A, 498B of the slots 490A, 490B in the first gear 458. The gear portions 510A, 510B are thereby moved to the spread position, as shown in FIG. 14. In this position, the teeth 514A, 514B on the gear portions 510A, 510B engage the teeth 534 of the third gear 466 to transmit rotation from the first gear 458 to the third gear 466. The third gear 466 in turn rotates the knife support 538 to pivot the knife 430 from a starting position (FIG. 12) toward the pipe holder 426 to cut a pipe supported by the pipe holder 426.

When the motor 446 is operated in the reverse direction, the first gear 458 is rotated by the spindle 454 such that the pins 518A, 518B of the gear portions 510A, 510B move to the inner portions 494A, 494B of the slots 490A, 490B in the first gear 458. The gear portions 510A, 510B are thereby moved to the collapsed position, as shown in FIG. 15. In this position, the teeth 514A, 514B on the gear portions 510A, 510B are spaced apart from the teeth 534 of the third gear 466, allowing the third gear 466 to rotate relative to the second gear 462. When the third gear 466 is disengaged from the second gear 462, the knife 430 can pivot back to the starting position without further operation of the motor 446 in the reverse direction. In some embodiments, the knife 430 can be pivoted away from the pipe holder 426 manually. In other embodiments, the knife 330 can be pivoted away from the pipe holder 426 automatically with a biasing member, such as the extension spring 210 shown in FIGS. 3 and 5.

FIGS. 16-19 illustrate another embodiment of a pipe cutter 610. Similar to the pipe cutter 10, 10B, 110, 310, 410 of FIGS. 1A-5 and 10-15, the illustrated pipe cutter 610 includes a pipe holder 626, a knife 630, a motor (not shown), and a drive mechanism 650. The drive mechanism 650 includes a planetary gear reduction 654 coupled to and driven by the motor, a first gear (similar to the bevel gear 178 shown in FIGS. 3-5) coupled to and driven by the planetary gear reduction 654, and a second gear 662 intermeshed with the first gear. In the illustrated embodiment, the first gear and the second gear 662 are bevel gears, although in further embodiments, the first gear and the second gear 662 may be other types of gears.

Figure 16:
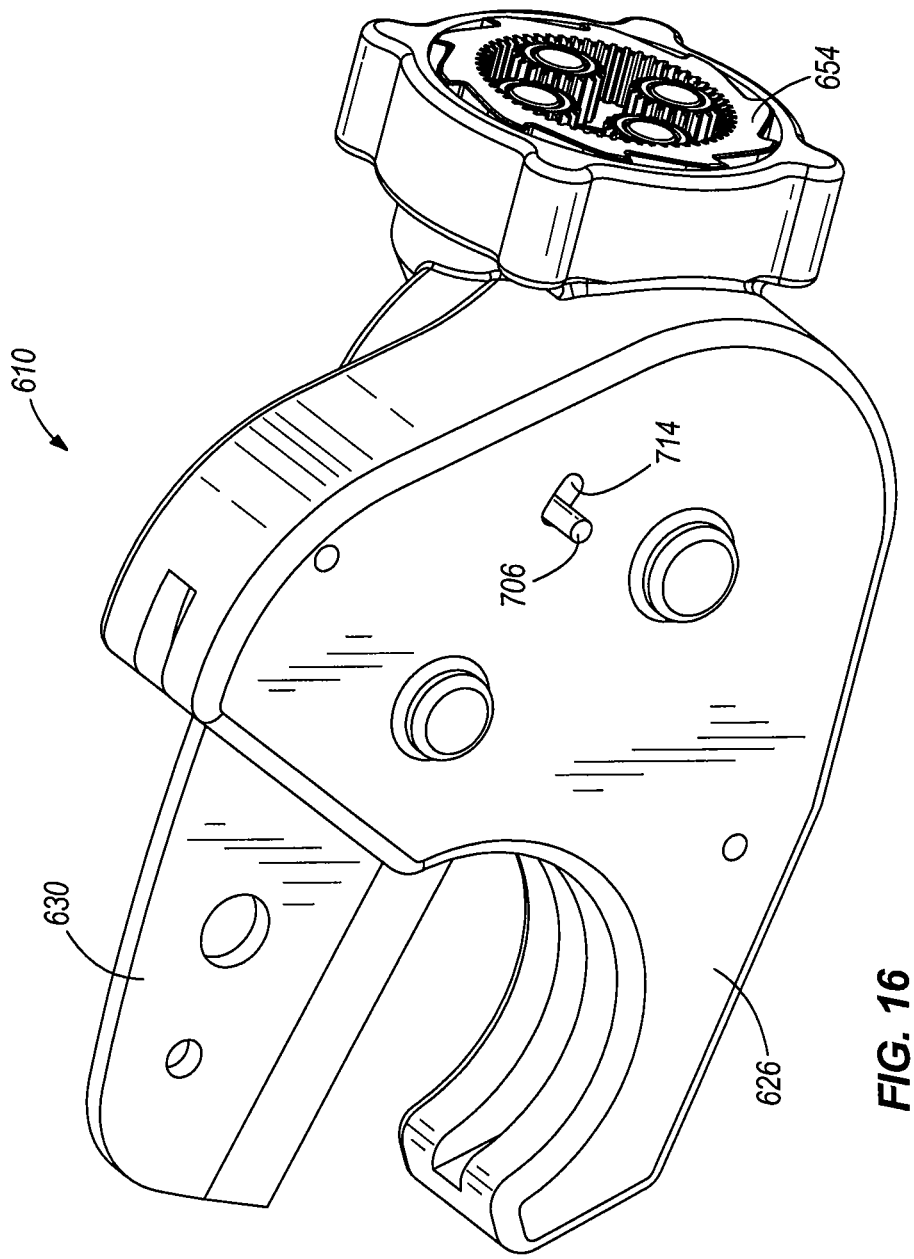
FIG. 16 is a perspective view of a portion of a pipe cutter according to still another embodiment of the invention.
Figure 17:
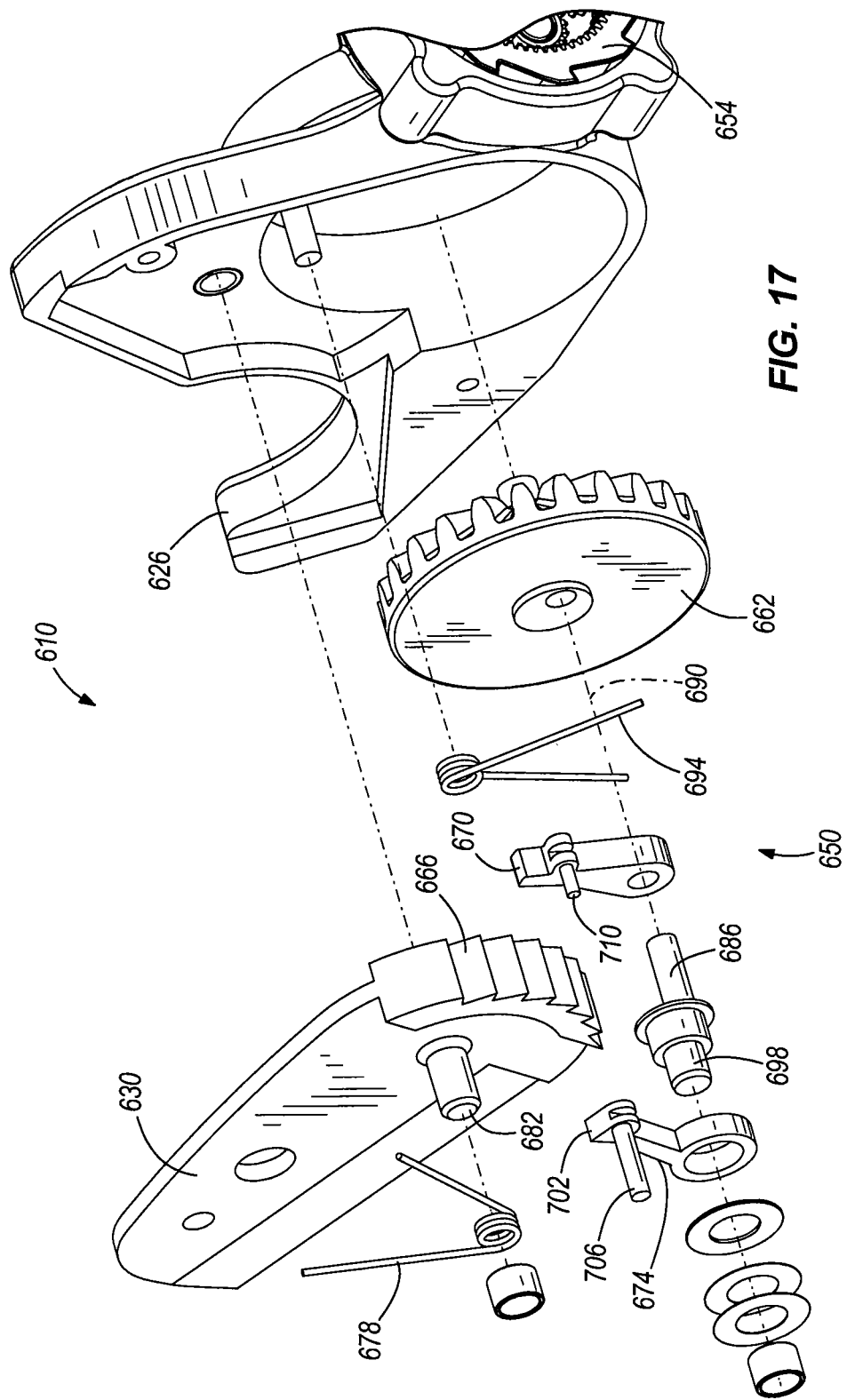
FIG. 17 is an exploded perspective view of the portion of the pipe cutter shown in FIG. 16.
Figure 18:
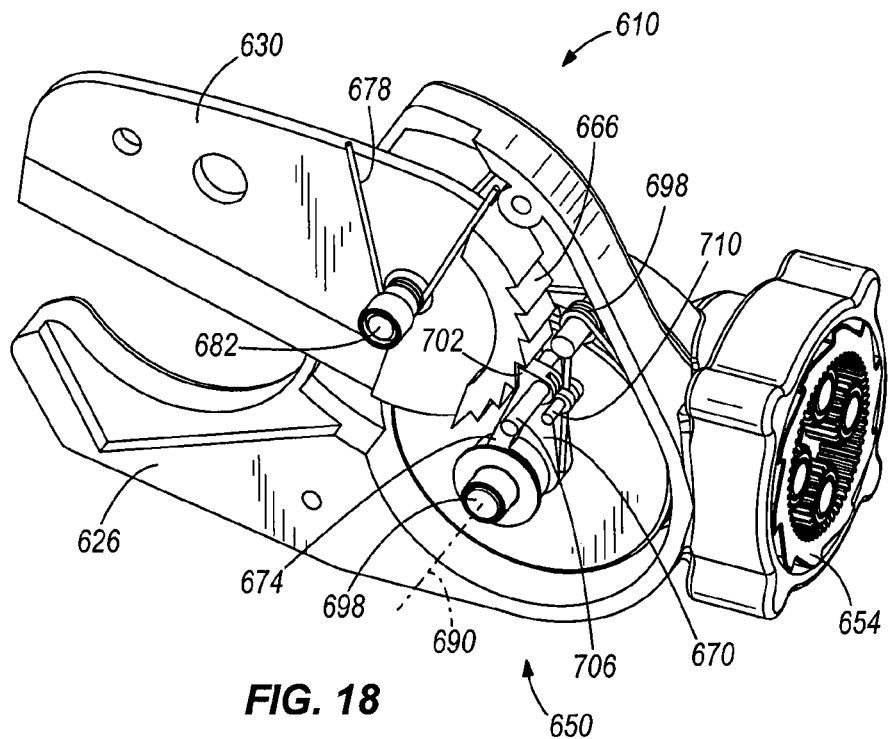
FIG. 18 is a perspective view of the portion of the pipe cutter shown in FIG. 16 with housing portions of the pipe cutter removed to show internal gear mechanisms in an engaged position.
Figure 19:
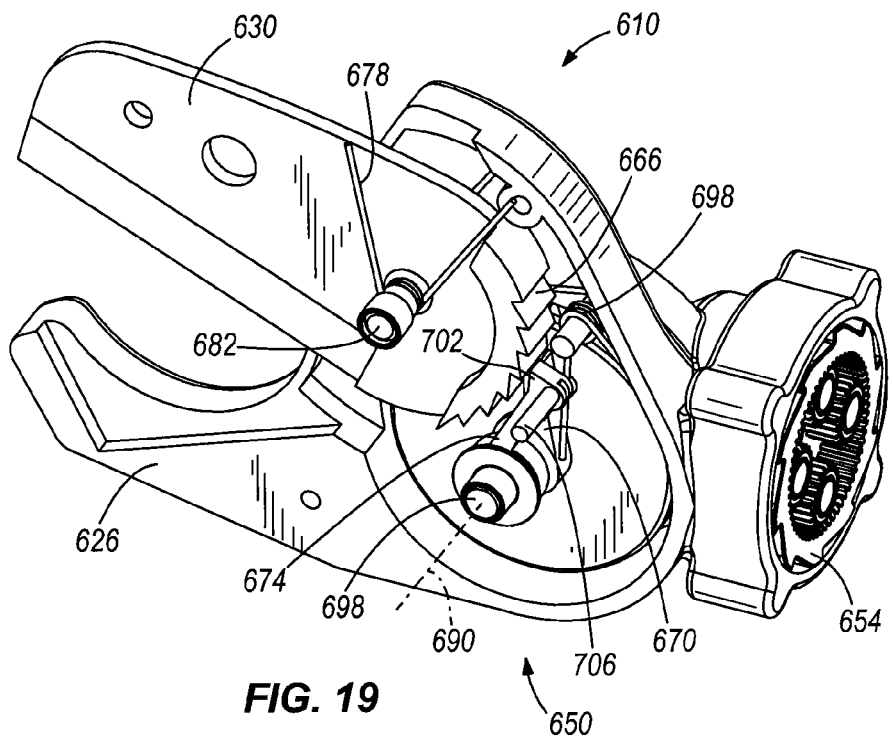
FIG. 19 is a perspective view of the portion of the pipe cutter shown in FIG. 18 with the internal gear mechanisms in a disengaged position.
Figure 20:
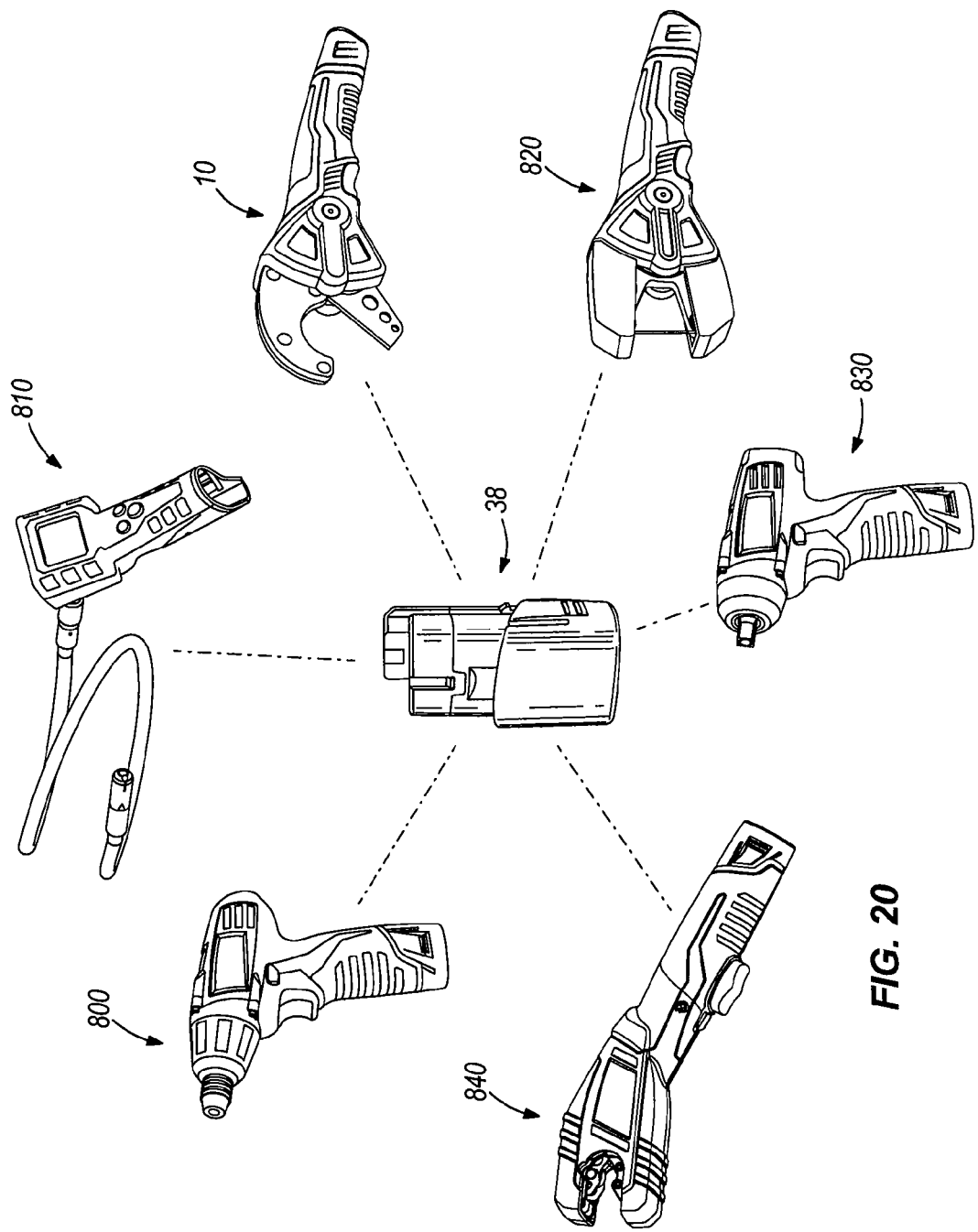
FIG. 20 illustrates a battery pack for use with a variety of power tools.

As shown in FIGS. 17-19, the drive mechanism 650 also includes a gear rack 666, a drive pawl 670, and a retaining pawl 674. In the illustrated embodiment, the gear rack 666, or toothed portion, is formed along an edge of the knife 630 within the pipe holder 626. In other embodiments, the gear rack 666 may be a separate gear coupled to the knife 630. A biasing member 678, or return spring, is coupled to a shaft 682 extending from the knife 630. The return spring 678 engages the gear rack 666 and the pipe holder 626 to bias the knife 630 away from the pipe holder 626 to a starting position (FIG. 16).

The illustrated drive pawl 670 is coupled to the second gear 662 by a crank shaft 686. The crank shaft 686 is offset from a central axis 690 of the second gear 662 such that, as the second gear 662 rotates about the central axis 690, the drive pawl 670 is moved relative to the second gear 662. As shown in FIG. 18, the drive pawl 670 engages the gear rack 666 to move the knife 630 against the bias of the return spring 678 toward the pipe holder 626 to cut a pipe. A biasing member 694, or pawl spring, is positioned between the drive pawl 670 and the pipe holder 626. The pawl spring 694 biases the drive pawl 670 into continuous engagement with the gear rack 666 as the second gear 662 rotates.

During rotation of the second gear 662 (clockwise in FIG. 18), the drive pawl 670 engages a tooth of the gear rack 666 and pushes the tooth away from the central axis 690 (generally upward in FIG. 18), pivoting the knife 630 about the shaft 682 (counterclockwise in FIG. 18). After a complete revolution of the second gear 662, the drive pawl 670 is moved into engagement with the next tooth of the gear rack 666 to push that tooth away from the central axis 690. As such, each rotation of the second gear 662 moves the drive pawl 670 into engagement with a successive tooth of the gear rack 666 to pivot the knife 630 toward the pipe holder 626 in a ratchet-like manner.

The retaining pawl 674 is coupled to the pipe holder 626 on a shaft 698 extending from the pipe holder 626 toward the second gear 662. In the illustrated embodiment, the shaft 698 is substantially coaxial with the central axis 690 of the second gear 662. As shown in FIGS. 17-19, the retaining pawl 674 includes a hooked portion 702 and a lever 706. The hooked portion 702 engages the gear rack 666 to inhibit the knife 630 from returning to the starting position when the drive pawl 670 slides from one tooth of the gear rack 666 to the next. The drive pawl 670 also includes a projection 710 that engages the retaining pawl 674 such that the retaining pawl 674 is biased by the pawl spring 694 into engagement with the gear rack 666.

The lever 706, or actuator, extends through a slot 714 (FIG. 16) in the pipe holder 626. As shown in FIG. 19, the lever 706 is actuable by a user to move the retaining pawl 674 out of engagement with the gear rack 666. When the retaining pawl 674 is pivoted away from the gear rack 666, the retaining pawl 674 engages the projection 710 of the drive pawl 670 to also move the drive pawl 670 out of engagement with the gear rack 666. The pawls 670, 674 are thereby disengaged from the gear rack 666 such that the return spring 678 biases the knife 630 away from the pipe holder 626 and back to the starting position. Releasing the lever 702 returns the pawls 670, 670 into engagement with the gear rack 666, allowing the drive mechanism 650 to pivot the knife 630 back toward the pipe holder 626 to cut a pipe.

Although the invention has been described in detail with reference to certain preferred embodiments, variations and modifications exist within the scope and spirit of one or more independent aspects of the invention as described. Various features and advantages of the invention are set forth in the following claims.

What is claimed is:

1. A pipe cutter comprising:
a housing assembly;
a motor positioned at least partially within the housing assembly;
a pipe holder coupled to the housing assembly, the pipe holder configured to support a pipe;
a cutting mechanism coupled to the pipe holder, the cutting mechanism movable through an angle in a first direction toward the pipe holder and movable through the angle in a second direction away from the pipe holder;
a drive mechanism positioned at least partially within the housing assembly, the drive mechanism coupled to the cutting mechanism and the motor to provide a driving force about a pivot point to move the cutting mechanism from a starting position through the angle in the first direction to cut the pipe, the drive mechanism including a first member operable to disengage a second member to allow movement of the cutting mechanism through the angle in the second direction to the starting position;
a spring positioned between the pipe holder and the cutting mechanism, the spring operable to move the cutting mechanism through the angle in the second direction to the starting position when the first member disengages the second member; and
a battery pack removably coupled to the housing assembly, the battery pack electrically coupled to the motor to selectively power the motor to operate the drive mechanism.

2. The pipe cutter of claim 1, wherein the first member is a first gear including a toothed portion and a non-toothed portion and the second member is a second gear coupled to the cutting mechanism, wherein the motor rotates the first gear such that, when the toothed portion engages the second gear, the cutting mechanism moves from the starting position through the angle in the first direction and, when the non-toothed portion is adjacent to the second gear, the cutting mechanism is allowed to move through the angle in the second direction to the starting position.

3. The pipe cutter of claim 1, wherein the drive mechanism includes an actuator coupled to the first member, and wherein the actuator is operable to disengage the first member from the second member to allow movement of the cutting mechanism through the angle in the second direction to the starting position.

4. The pipe cutter of claim 3, wherein the drive mechanism includes a planetary gear reduction having an outer ring, wherein the first member is a lock key and the second member is the outer ring, wherein the lock key engages the outer ring to transmit rotation of the motor through the planetary gear reduction to move the cutting mechanism from the starting position through the angle in the first direction, and wherein the actuator is operable to disengage the lock key from the outer ring to allow movement of the cutting mechanism through the angle in the second direction to the starting position.

5. The pipe cutter of claim 3, wherein the first member is a retaining pawl and the second member is a toothed portion coupled to the cutting mechanism, wherein the retaining pawl engages the toothed portion to help move the cutting mechanism from the starting position through the angle in the first direction, and wherein the actuator is operable to disengage the retaining pawl from the toothed portion to allow movement of the cutting mechanism through the angle in the second direction to the starting position.

6. The pipe cutter of claim 1, wherein the motor is operable in a forward direction to move the cutting mechanism from the starting position through the angle in the first direction and is operable in a reverse direction to disengage the first member from the second member to allow movement of the cutting mechanism through the angle in the second direction to the starting position.

7. The pipe cutter of claim 6, wherein the first member is a disc and the second member is a support coupled to the cutting mechanism, wherein the disc frictionally engages the support when the motor is operated in the forward direction to move the cutting mechanism from the starting position through the angle in the first direction, and wherein the disc disengages the support when the motor is operated in the reverse direction to allow movement of the cutting mechanism through the angle in the second direction to the starting position.

8. The pipe cutter of claim 6, wherein the drive mechanism includes a first gear defining a slot, wherein the first member is a second gear including a pin and the second member is a third gear coupled to the second gear, wherein the pin is positioned within a first portion of the slot when the motor is operated in the forward direction such that the second gear engages the third gear to move the cutting mechanism from the starting position through the angle in the first direction, and wherein the pin is positioned within a second portion of the slot when the motor is operated in a reverse direction such that the second gear disengages the third gear to allow movement of the cutting mechanism through the angle in the second direction to the starting position.

9. The pipe cutter of claim 1, wherein the battery pack is a Lithium-ion based battery pack.

10. The pipe cutter of claim 1, wherein the battery pack is a power tool battery pack usable with the pipe cutter and another power tool.

* * * * *